United States Patent
Ozawa et al.

(10) Patent No.: US 10,540,996 B2
(45) Date of Patent: *Jan. 21, 2020

(54) MAGNETIC TAPE HAVING CHARACTERIZED MAGNETIC LAYER AND MAGNETIC TAPE DEVICE

(71) Applicant: FUJIFILM Corporation, Tokyo (JP)

(72) Inventors: Eiki Ozawa, Minami-ashigara (JP); Norihito Kasada, Minami-ashigara (JP); Masahito Oyanagi, Minami-ashigara (JP); Toshio Tada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/280,195

(22) Filed: Sep. 29, 2016

(65) Prior Publication Data

US 2017/0092315 A1   Mar. 30, 2017

(30) Foreign Application Priority Data

Sep. 30, 2015   (JP) ................................ 2015-195165
Sep. 29, 2016   (JP) ................................ 2016-190494

(51) Int. Cl.
*G11B 5/70* (2006.01)
*G11B 5/708* (2006.01)

(52) U.S. Cl.
CPC ................ *G11B 5/708* (2013.01); *G11B 5/70* (2013.01)

(58) Field of Classification Search
None
See application file for complete search history.

(56) References Cited

U.S. PATENT DOCUMENTS

| | | |
|---|---|---|
| 3,966,686 A | 6/1976 | Asakura et al. |
| 4,112,187 A | 9/1978 | Asakura et al. |
| 4,425,404 A | 1/1984 | Suzuki et al. |
| 4,693,930 A | 9/1987 | Kuo et al. |
| 4,746,569 A | 5/1988 | Takahashi et al. |
| 4,825,317 A | 4/1989 | Rausch |
| 5,242,752 A | 9/1993 | Isobe et al. |
| 5,419,938 A | 5/1995 | Kagotani et al. |
| 5,445,881 A | 8/1995 | Irie |
| 5,474,814 A | 12/1995 | Komatsu et al. |
| 5,496,607 A | 3/1996 | Inaba et al. |
| 5,540,957 A | 7/1996 | Ueda et al. |
| 5,585,032 A | 12/1996 | Nakata et al. |
| 5,645,917 A | 7/1997 | Ejiri et al. |
| 5,689,384 A | 11/1997 | Albrecht et al. |
| 5,728,454 A | 3/1998 | Inaba et al. |
| 5,786,074 A | 7/1998 | Soui |
| 5,827,600 A | 10/1998 | Ejiri et al. |
| 6,099,957 A | 8/2000 | Yamamoto et al. |
| 6,183,606 B1 | 2/2001 | Kuo et al. |
| 6,207,252 B1 * | 3/2001 | Shimomura ............. G11B 5/70 428/141 |
| 6,228,461 B1 | 5/2001 | Sueki et al. |
| 6,254,964 B1 | 7/2001 | Saito et al. |
| 6,261,647 B1 | 7/2001 | Komatsu et al. |
| 6,268,043 B1 | 7/2001 | Koizumi et al. |
| 6,496,328 B1 | 12/2002 | Dugas |
| 6,579,826 B2 | 6/2003 | Furuya et al. |
| 6,649,256 B1 | 11/2003 | Buczek et al. |
| 6,686,022 B2 | 2/2004 | Takano et al. |
| 6,770,359 B2 | 8/2004 | Masaki |
| 6,791,803 B2 | 9/2004 | Saito et al. |
| 6,835,461 B1 | 12/2004 | Yamagata et al. |
| 6,893,746 B1 | 5/2005 | Kirino et al. |
| 6,921,592 B2 | 7/2005 | Tani et al. |
| 6,939,606 B2 | 9/2005 | Hashimoto et al. |
| 6,950,269 B1 | 9/2005 | Johnson |
| 6,994,925 B2 | 2/2006 | Masaki |
| 7,014,927 B2 | 3/2006 | Sueki et al. |
| 7,029,726 B1 | 4/2006 | Chen et al. |

(Continued)

FOREIGN PATENT DOCUMENTS

DE   101 46 429 A1   3/2002
GB   2495356 A   4/2013

(Continued)

OTHER PUBLICATIONS

Notice of Allowance dated Apr. 27, 2017, which issued during the prosecution of U.S. Appl. No. 15/052,115.
Notice of Allowance dated Jun. 2, 2017, which issued during the prosecution of U.S. Appl. No. 15/218,190.
An Office Action dated May 4, 2018, which issued during the prosecution of U.S. Appl. No. 15/422,821.
An Office Action dated May 4, 2018, which issued during the prosecution of U.S. Appl. No. 15/625,428.
An Office Action dated May 4, 2018, which issued during the prosecution of U.S. Appl. No. 15/422,944.
An Office Action dated May 7, 2018, which issued during the prosecution of U.S. Appl. No. 15/624,897.

(Continued)

*Primary Examiner* — Kevin M Bernatz
(74) *Attorney, Agent, or Firm* — Sughrue Mion, PLLC

(57) ABSTRACT

A magnetic tape has a magnetic layer containing ferromagnetic powder and binder on a nonmagnetic support. The magnetic layer contains a fatty acid ester. The full width at half maximum of the spacing distribution as measured by optical interferometry on the magnetic layer side surface of the magnetic tape before vacuum heating the magnetic tape is greater than 0 nm but less than or equal to 5.0 nm. The full width at half maximum of the spacing distribution after vacuum heating the magnetic tape is greater than 0 nm but less than or equal to 5.0 nm. The difference between the spacing $S_{after}$ after vacuum heating the magnetic tape and the spacing $S_{before}$ before vacuum heating the magnetic tape, $S_{after} - S_{before}$, is greater than 0 nm but less than or equal to 8.0 nm.

20 Claims, 1 Drawing Sheet

(56) References Cited

U.S. PATENT DOCUMENTS

| | | |
|---|---|---|
| 7,153,366 B1 | 12/2006 | Chen et al. |
| 7,255,908 B2 | 8/2007 | Ishikawa et al. |
| 7,511,907 B2 | 3/2009 | Dugas et al. |
| 7,515,383 B2 | 4/2009 | Saito et al. |
| 7,803,471 B1 | 9/2010 | Ota et al. |
| 7,839,599 B2 | 11/2010 | Bui et al. |
| 8,000,057 B2 | 8/2011 | Bui et al. |
| 8,524,108 B2 | 9/2013 | Hattori |
| 8,535,817 B2 * | 9/2013 | Imaoka .................. G11B 5/70 |
| | | 428/844 |
| 8,576,510 B2 | 11/2013 | Cherubini et al. |
| 8,681,451 B2 | 3/2014 | Harasawa et al. |
| 9,105,294 B2 | 8/2015 | Jensen et al. |
| 9,311,946 B2 | 4/2016 | Tanaka et al. |
| 9,495,985 B2 | 11/2016 | Biskeborn et al. |
| 9,530,444 B2 | 12/2016 | Kasada |
| 9,542,967 B2 | 1/2017 | Sekiguchi et al. |
| 9,564,161 B1 | 2/2017 | Cherubini et al. |
| 9,601,146 B2 | 3/2017 | Kasada et al. |
| 9,704,425 B2 | 7/2017 | Zhang et al. |
| 9,704,525 B2 | 7/2017 | Kasada |
| 9,704,527 B2 | 7/2017 | Kasada |
| 9,711,174 B2 | 7/2017 | Kasada et al. |
| 9,721,605 B2 | 8/2017 | Oyanagi et al. |
| 9,721,606 B2 | 8/2017 | Kasada |
| 9,721,607 B2 | 8/2017 | Tada et al. |
| 9,748,026 B1 | 8/2017 | Shirata |
| 9,773,519 B2 | 9/2017 | Kasada et al. |
| 9,779,772 B1 | 10/2017 | Kasada et al. |
| 9,837,104 B1 | 12/2017 | Biskeborn |
| 9,837,116 B2 * | 12/2017 | Ozawa ............... G11B 5/00813 |
| 9,959,894 B2 | 5/2018 | Omura |
| 9,972,351 B1 | 5/2018 | Kaneko et al. |
| 9,978,414 B1 | 5/2018 | Kaneko et al. |
| 9,984,710 B2 | 5/2018 | Kasada |
| 9,984,712 B1 | 5/2018 | Ozawa |
| 9,984,716 B1 | 5/2018 | Kaneko et al. |
| 10,008,230 B1 * | 6/2018 | Ozawa .................... G11B 5/71 |
| 10,026,430 B2 | 7/2018 | Kasada et al. |
| 10,026,433 B2 | 7/2018 | Kasada et al. |
| 10,026,434 B2 | 7/2018 | Oyanagi et al. |
| 10,026,435 B2 | 7/2018 | Kasada et al. |
| 10,062,403 B1 | 8/2018 | Kasada et al. |
| 10,074,393 B2 | 9/2018 | Kaneko et al. |
| 10,134,433 B2 | 11/2018 | Kasada et al. |
| 10,170,144 B2 * | 1/2019 | Ozawa .................... G11B 5/70 |
| 10,360,937 B2 * | 7/2019 | Ozawa .................... G11B 5/70 |
| 2001/0038928 A1 | 11/2001 | Nakamigawa et al. |
| 2001/0053458 A1 | 12/2001 | Suzuki et al. |
| 2002/0072472 A1 | 7/2002 | Furuya et al. |
| 2002/0122339 A1 | 9/2002 | Takano et al. |
| 2003/0059649 A1 | 3/2003 | Saliba et al. |
| 2003/0091866 A1 | 5/2003 | Ejiri et al. |
| 2003/0124386 A1 | 7/2003 | Masaki |
| 2003/0170498 A1 | 9/2003 | Inoue |
| 2003/0228493 A1 | 12/2003 | Doushita et al. |
| 2004/0018388 A1 | 1/2004 | Kitamura et al. |
| 2004/0053074 A1 | 3/2004 | Jingu et al. |
| 2004/0072025 A1 | 4/2004 | Kishimoto et al. |
| 2004/0197605 A1 | 10/2004 | Seki et al. |
| 2004/0213948 A1 | 10/2004 | Saito et al. |
| 2004/0218304 A1 | 11/2004 | Goker et al. |
| 2004/0265643 A1 | 12/2004 | Ejiri |
| 2005/0057838 A1 | 3/2005 | Ohtsu |
| 2005/0153170 A1 | 7/2005 | Inoue et al. |
| 2005/0196645 A1 | 9/2005 | Doi et al. |
| 2005/0260456 A1 | 11/2005 | Hanai et al. |
| 2005/0260459 A1 | 11/2005 | Hanai et al. |
| 2005/0264935 A1 | 12/2005 | Sueki et al. |
| 2006/0008681 A1 | 1/2006 | Hashimoto et al. |
| 2006/0035114 A1 | 2/2006 | Kuse et al. |
| 2006/0056095 A1 | 3/2006 | Saitou |
| 2006/0068232 A1 | 3/2006 | Mikamo et al. |
| 2006/0187589 A1 | 8/2006 | Harasawa et al. |
| 2006/0232883 A1 | 10/2006 | Biskeborn et al. |
| 2007/0009769 A1 | 1/2007 | Kanazawa |
| 2007/0020489 A1 | 1/2007 | Yamazaki et al. |
| 2007/0020490 A1 | 1/2007 | Harasawa et al. |
| 2007/0224456 A1 | 9/2007 | Murao et al. |
| 2007/0230054 A1 | 10/2007 | Takeda et al. |
| 2007/0231606 A1 | 10/2007 | Hanai |
| 2008/0057351 A1 | 3/2008 | Meguro et al. |
| 2008/0144211 A1 | 6/2008 | Weber et al. |
| 2008/0152956 A1 | 6/2008 | Murayama et al. |
| 2008/0174897 A1 | 7/2008 | Bates et al. |
| 2008/0297950 A1 | 12/2008 | Noguchi et al. |
| 2008/0311308 A1 | 12/2008 | Lee et al. |
| 2009/0027812 A1 | 1/2009 | Noguchi et al. |
| 2009/0087689 A1 | 4/2009 | Doushita et al. |
| 2009/0161249 A1 | 6/2009 | Takayama et al. |
| 2009/0162701 A1 | 6/2009 | Jensen et al. |
| 2010/0000966 A1 | 1/2010 | Kamata et al. |
| 2010/0035086 A1 | 2/2010 | Inoue et al. |
| 2010/0035088 A1 | 2/2010 | Inoue |
| 2010/0053810 A1 | 3/2010 | Biskeborn et al. |
| 2010/0073816 A1 | 3/2010 | Komori et al. |
| 2010/0081011 A1 | 4/2010 | Nakamura |
| 2010/0134929 A1 | 6/2010 | Ito |
| 2010/0227201 A1 | 9/2010 | Sasaki et al. |
| 2010/0246073 A1 | 9/2010 | Katayama |
| 2011/0003241 A1 | 1/2011 | Kaneko et al. |
| 2011/0051280 A1 | 3/2011 | Karp et al. |
| 2011/0052908 A1 | 3/2011 | Imaoka |
| 2011/0077902 A1 | 3/2011 | Awezec et al. |
| 2011/0151281 A1 | 6/2011 | Inoue |
| 2011/0244272 A1 | 10/2011 | Suzuki et al. |
| 2012/0045664 A1 * | 2/2012 | Tanaka .................... G11B 5/71 |
| | | 428/840.2 |
| 2012/0152891 A1 | 6/2012 | Brown et al. |
| 2012/0177951 A1 | 7/2012 | Yamazaki et al. |
| 2012/0183811 A1 | 7/2012 | Hattori et al. |
| 2012/0196156 A1 | 8/2012 | Suzuki |
| 2012/0243120 A1 | 9/2012 | Harasawa et al. |
| 2012/0244387 A1 | 9/2012 | Mori et al. |
| 2012/0251845 A1 | 10/2012 | Wang et al. |
| 2013/0029183 A1 | 1/2013 | Omura et al. |
| 2013/0084470 A1 | 4/2013 | Hattori et al. |
| 2013/0088794 A1 | 4/2013 | Cherubini et al. |
| 2013/0256584 A1 | 10/2013 | Yamazaki et al. |
| 2013/0260179 A1 | 10/2013 | Kasada et al. |
| 2013/0279040 A1 * | 10/2013 | Cideciyan ............. H03M 13/13 |
| | | 360/53 |
| 2013/0286510 A1 | 10/2013 | Rothermel et al. |
| 2014/0011055 A1 | 1/2014 | Suzuki et al. |
| 2014/0130067 A1 | 5/2014 | Madison et al. |
| 2014/0139944 A1 | 5/2014 | Johnson et al. |
| 2014/0272474 A1 | 9/2014 | Kasada |
| 2014/0295214 A1 | 10/2014 | Tada et al. |
| 2014/0342189 A1 | 11/2014 | Tachibana et al. |
| 2014/0366990 A1 | 12/2014 | Lai et al. |
| 2014/0374645 A1 | 12/2014 | Kikuchi et al. |
| 2015/0043101 A1 | 2/2015 | Biskeborn et al. |
| 2015/0098149 A1 | 4/2015 | Bates et al. |
| 2015/0111066 A1 | 4/2015 | Terakawa et al. |
| 2015/0123026 A1 | 5/2015 | Masada et al. |
| 2015/0302879 A1 | 10/2015 | Holmberg et al. |
| 2015/0380036 A1 | 12/2015 | Kasada et al. |
| 2016/0061447 A1 | 3/2016 | Kobayashi |
| 2016/0064025 A1 | 3/2016 | Kurokawa et al. |
| 2016/0092315 A1 | 3/2016 | Ashida et al. |
| 2016/0093321 A1 | 3/2016 | Aoshima et al. |
| 2016/0093322 A1 | 3/2016 | Kasada et al. |
| 2016/0093323 A1 | 3/2016 | Omura |
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |
| 2017/0032812 A1 | 2/2017 | Kasada |
| 2017/0053669 A1 | 2/2017 | Kasada |
| 2017/0053670 A1 | 2/2017 | Oyanagi et al. |
| 2017/0053671 A1 | 2/2017 | Kasada et al. |
| 2017/0058227 A1 | 3/2017 | Kondo et al. |

(56) References Cited

U.S. PATENT DOCUMENTS

| | | |
|---|---|---|
| 2017/0092315 A1 | 3/2017 | Ozawa et al. |
| 2017/0130156 A1 | 5/2017 | Kondo et al. |
| 2017/0178675 A1 | 6/2017 | Kasada |
| 2017/0178676 A1 | 6/2017 | Kasada |
| 2017/0178677 A1 | 6/2017 | Kasada |
| 2017/0186456 A1 | 6/2017 | Tada et al. |
| 2017/0186460 A1 | 6/2017 | Kasada et al. |
| 2017/0221513 A1 | 8/2017 | Hiroi et al. |
| 2017/0221516 A1* | 8/2017 | Oyanagi .................. G11B 5/66 |
| 2017/0221517 A1* | 8/2017 | Ozawa ..................... G11B 5/70 |
| 2017/0249963 A1 | 8/2017 | Oyanagi et al. |
| 2017/0249964 A1 | 8/2017 | Kasada et al. |
| 2017/0249965 A1 | 8/2017 | Kurokawa et al. |
| 2017/0249966 A1 | 8/2017 | Tachibana et al. |
| 2017/0287517 A1 | 10/2017 | Hosoya et al. |
| 2017/0355022 A1 | 12/2017 | Kaneko et al. |
| 2017/0358318 A1 | 12/2017 | Kasada et al. |
| 2017/0372726 A1 | 12/2017 | Kasada et al. |
| 2017/0372727 A1 | 12/2017 | Kasada et al. |
| 2017/0372736 A1 | 12/2017 | Kaneko et al. |
| 2017/0372737 A1 | 12/2017 | Oyanagi et al. |
| 2017/0372738 A1 | 12/2017 | Kasada |
| 2017/0372739 A1* | 12/2017 | Ozawa ..................... G11B 5/78 |
| 2017/0372740 A1* | 12/2017 | Ozawa ..................... G11B 5/78 |
| 2017/0372741 A1* | 12/2017 | Kurokawa ............... G11B 5/78 |
| 2017/0372742 A1 | 12/2017 | Kaneko et al. |
| 2017/0372743 A1 | 12/2017 | Kasada et al. |
| 2017/0372744 A1* | 12/2017 | Ozawa ................... G11B 5/584 |
| 2018/0061446 A1 | 3/2018 | Kasada |
| 2018/0061447 A1 | 3/2018 | Kasada |
| 2018/0082710 A1 | 3/2018 | Tada et al. |
| 2018/0137887 A1 | 5/2018 | Sekiguchi et al. |
| 2018/0182417 A1 | 6/2018 | Kaneko et al. |
| 2018/0182422 A1 | 6/2018 | Kawakami et al. |
| 2018/0182425 A1 | 6/2018 | Kasada et al. |
| 2018/0182426 A1 | 6/2018 | Ozawa et al. |
| 2018/0182427 A1 | 6/2018 | Kasada et al. |
| 2018/0182429 A1 | 6/2018 | Kasada et al. |
| 2018/0182430 A1* | 6/2018 | Ozawa ..................... G11B 5/78 |
| 2018/0182428 A1 | 7/2018 | Kasada et al. |
| 2018/0240475 A1 | 8/2018 | Kasada |
| 2018/0240476 A1 | 8/2018 | Kasada et al. |
| 2018/0240478 A1 | 8/2018 | Kasada et al. |
| 2018/0240479 A1 | 8/2018 | Kasada et al. |
| 2018/0240481 A1 | 8/2018 | Kasada et al. |
| 2018/0240488 A1 | 8/2018 | Kasada |
| 2018/0240489 A1 | 8/2018 | Kasada et al. |
| 2018/0240490 A1 | 8/2018 | Kurokawa et al. |
| 2018/0240491 A1* | 8/2018 | Ozawa ............... G11B 5/00813 |
| 2018/0240492 A1 | 8/2018 | Kasada |
| 2018/0240493 A1 | 8/2018 | Tada et al. |
| 2018/0240494 A1 | 8/2018 | Kurokawa et al. |
| 2018/0240495 A1 | 8/2018 | Kasada |
| 2018/0286439 A1* | 10/2018 | Ozawa ................. G11B 5/3909 |
| 2018/0286442 A1* | 10/2018 | Ozawa ................ G11B 5/70615 |
| 2018/0286443 A1* | 10/2018 | Ozawa ............... G11B 5/70615 |
| 2018/0286444 A1 | 10/2018 | Kasada et al. |
| 2018/0286446 A1* | 10/2018 | Ozawa ................... G11B 5/712 |
| 2018/0286447 A1 | 10/2018 | Ozawa et al. |
| 2018/0286448 A1* | 10/2018 | Ozawa ................... G11B 5/714 |
| 2018/0286449 A1 | 10/2018 | Kasada et al. |
| 2018/0286450 A1 | 10/2018 | Kasada et al. |
| 2018/0286451 A1* | 10/2018 | Ozawa ..................... G11B 5/70 |
| 2018/0286452 A1 | 10/2018 | Ozawa et al. |
| 2018/0286453 A1 | 10/2018 | Kasada et al. |
| 2018/0301165 A1 | 10/2018 | Oyanagi et al. |
| 2018/0350398 A1 | 12/2018 | Kawakami et al. |
| 2018/0350400 A1 | 12/2018 | Kaneko et al. |
| 2018/0358042 A1 | 12/2018 | Kasada et al. |
| 2018/0374507 A1 | 12/2018 | Kasada |
| 2019/0027167 A1 | 1/2019 | Tada et al. |
| 2019/0027168 A1 | 1/2019 | Kasada et al. |
| 2019/0027171 A1 | 1/2019 | Kasada |
| 2019/0027172 A1 | 1/2019 | Kasada |
| 2019/0027174 A1 | 1/2019 | Tada et al. |
| 2019/0027175 A1 | 1/2019 | Kurokawa et al. |
| 2019/0027176 A1 | 1/2019 | Kurokawa et al. |
| 2019/0027177 A1 | 1/2019 | Kasada |
| 2019/0027178 A1 | 1/2019 | Kasada |
| 2019/0027179 A1* | 1/2019 | Ozawa ................... G11B 5/735 |
| 2019/0027180 A1 | 1/2019 | Kasada et al. |
| 2019/0027181 A1 | 1/2019 | Ozawa et al. |
| 2019/0035424 A1 | 1/2019 | Endo |
| 2019/0051325 A1 | 2/2019 | Kasada et al. |
| 2019/0088278 A1 | 3/2019 | Kasada et al. |
| 2019/0096437 A1* | 3/2019 | Ozawa ..................... G11B 5/70 |
| 2019/0103130 A1 | 4/2019 | Kasada et al. |
| 2019/0103131 A1 | 4/2019 | Kasada et al. |
| 2019/0103133 A1 | 4/2019 | Ozawa et al. |
| 2019/0103134 A1 | 4/2019 | Kasada et al. |
| 2019/0103135 A1 | 4/2019 | Ozawa et al. |
| 2019/0130936 A1 | 5/2019 | Kaneko et al. |
| 2019/0295590 A1 | 9/2019 | Kaneko et al. |

FOREIGN PATENT DOCUMENTS

| | | |
|---|---|---|
| JP | 61-11924 A | 1/1986 |
| JP | 61-139923 A | 6/1986 |
| JP | 61-139932 A | 6/1986 |
| JP | 63-129519 A | 6/1988 |
| JP | 63249932 A | 10/1988 |
| JP | 64-57422 A | 3/1989 |
| JP | 6460819 A | 3/1989 |
| JP | 5-258283 A | 10/1993 |
| JP | 5-298653 A | 11/1993 |
| JP | 7-57242 A | 3/1995 |
| JP | 11-110743 A | 4/1999 |
| JP | 11-175949 A | 7/1999 |
| JP | 11-273051 A | 10/1999 |
| JP | 2000-251240 A | 9/2000 |
| JP | 2002-157726 A | 5/2002 |
| JP | 2002-329605 A | 11/2002 |
| JP | 2002-367142 A | 12/2002 |
| JP | 2002-367318 A | 12/2002 |
| JP | 2003-77116 A | 3/2003 |
| JP | 2003-323710 A | 11/2003 |
| JP | 2004-005820 A | 1/2004 |
| JP | 2004-114492 A | 4/2004 |
| JP | 2004-133997 A | 4/2004 |
| JP | 2004-185676 A | 7/2004 |
| JP | 2005-38579 A | 2/2005 |
| JP | 2005-092967 A | 4/2005 |
| JP | 2005-243063 A | 9/2005 |
| JP | 2005-243162 A | 9/2005 |
| JP | 2006-92672 A | 4/2006 |
| JP | 2006-286114 A | 10/2006 |
| JP | 2007-265555 A | 10/2007 |
| JP | 2007-273039 A | 10/2007 |
| JP | 2007-287310 A | 11/2007 |
| JP | 2007-297427 A | 11/2007 |
| JP | 2008-047276 A | 2/2008 |
| JP | 2008-243317 A | 10/2008 |
| JP | 2009-283082 A | 12/2009 |
| JP | 2010-036350 A | 2/2010 |
| JP | 2010-049731 A | 3/2010 |
| JP | 2011-48878 A | 3/2011 |
| JP | 2011-138566 A | 7/2011 |
| JP | 2011-210288 A | 10/2011 |
| JP | 2011-225417 A | 11/2011 |
| JP | 2012-038367 A | 2/2012 |
| JP | 2012-43495 A | 3/2012 |
| JP | 2012-203955 A | 10/2012 |
| JP | 2013-25853 A | 2/2013 |
| JP | 2013-77360 A | 4/2013 |
| JP | 2013-164889 A | 8/2013 |
| JP | 2014-15453 A | 1/2014 |
| JP | 2014-179149 A | 9/2014 |
| JP | 2015-39801 A | 3/2015 |
| JP | 2015-111484 A | 6/2015 |
| JP | 2016-15183 A | 1/2016 |
| JP | 2016-502224 A | 1/2016 |
| JP | 2016-051493 A | 4/2016 |

(56) References Cited

FOREIGN PATENT DOCUMENTS

| JP | 2016-71926 A | 5/2016 |
|---|---|---|
| JP | 2016-139451 A | 8/2016 |

OTHER PUBLICATIONS

An Office Action dated May 7, 2018, which issued during the prosecution of U.S. Appl. No. 15/624,792.
An Office Action dated May 7, 2018, which issued during the prosecution of U.S. Appl. No. 15/626,832.
Notice of Allowance dated Aug. 30, 2017, which issued during the prosecution of U.S. Appl. No. 15/466,143.
Communication dated Dec. 6, 2016 from the U.S. Patent and Trademark Office in U.S. Appl. No. 14/757,555.
Communication dated Dec. 5, 2016 from the U.S. Patent and Trademark Office in U.S. Appl. No. 14/978,834.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Aug. 28, 2018, which issued during the prosecution of U.S. Appl. No. 15/422,821.
Notice of Allowance dated Sep. 4, 2018, which issued during the prosecution of U.S. Appl. No. 15/625,428.
Communication dated Aug. 3, 2018 from the U.S. Patent and Trademark Office in U.S. Appl. No. 15/380,336.
Communication dated Aug. 23, 2018 from the U.S. Patent and Trademark Office in U.S. Appl. No. 15/614,876.
Communication dated Aug. 24, 2018 from the U.S. Patent and Trademark Office in U.S. Appl. No. 15/620,916.
Communication dated Aug. 23, 2018 from the U.S. Patent and Trademark Office in U.S. Appl. No. 15/621,464.
Communication dated Aug. 23, 2018 from the U.S. Patent and Trademark Office in U.S. Appl. No. 15/626,720.
An Office Action dated Nov. 29, 2018, which issued during the prosecution of U.S. Appl. No. 15/380,309.
An Office Action dated Nov. 29, 2018, which issued during the prosecution of U.S. Appl. No. 15/422,821.
Notice of Allowance dated Aug. 6, 2018, which issued during the prosecution of U.S. Appl. No. 15/920,768.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.
Office Action dated Jul. 3, 2018, which issued during the prosecution of U.S. Appl. No. 15/920,518.
Office Action dated Nov. 28, 2018, which issued during the prosecution of U.S. Appl. No. 15/899,587.
Office Action dated Dec. 25, 2018 in Japanese Application No. 2015-254192.
Office Action dated Dec. 25, 2018 in Japanese Application No. 2015-245144.
Office Action dated Dec. 25, 2018 in Japanese Application No. 2015-245145.
Office Action dated Dec. 31, 2018 in U.S. Appl. No. 16/009,603.
Office Action dated Oct. 15, 2018, which issued during the prosecution of U.S. Appl. No. 15/619,012.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,897.
Notice of Allowance dated Oct. 11, 2018, which issued during the prosecution of U.S. Appl. No. 15/624,792.
Notice of Allowance dated Oct. 12, 2018, which issued during the prosecution of U.S. Appl. No. 15/626,832.
Notice of Allowance dated Oct. 11, 2018, which issued during the prosecution of U.S. Appl. No. 15/380,336.
Office Action dated Jul. 6, 2018, which issued during the prosecution of U.S. Appl. No. 15/848,173.
Office Action dated Oct. 9, 2018, which issued during the prosecution of U.S. Appl. No. 15/628,814.
Office Action dated Oct. 22, 2018, which issued during the prosecution of U.S. Appl. No. 15/854,439.
Office Action dated Sep. 24, 2018, which issued during the prosecution of U.S. Appl. No. 15/690,400.
Office Action dated Sep. 27, 2018, which issued during the prosecution of U.S. Appl. No. 15/690,906.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Sep. 27, 2018, which issued during the prosecution of U.S. Appl. No. 15/854,383.
Office Action dated Aug. 10, 2017, which issued during the prosecution of U.S. Appl. No. 14/870,618.
Notice of Allowance dated Feb. 14, 2018, which issued during the prosecution of U.S. Appl. No. 14/870,618.
Office Action dated Sep. 26, 2017 issued by the Japanese Patent Office in JP Appln. No. 2014-265723 corresponding to U.S. Appl. No. 14/870,618.
Office Action dated Sep. 26, 2017 issued by the Japanese Patent Office in JP Appln. No. 2015-249264 corresponding to U.S. Appl. No. 14/870,618.
U.S. Appl. No. 15/422,821, Pending.
U.S. Appl. No. 15/422,944, Allowed.
U.S. Appl. No. 15/624,897, Allowed; RCE filed Nov. 21, 2018.
U.S. Appl. No. 15/624,792, Allowed; RCE filed Nov. 21, 2018.
U.S. Appl. No. 15/626,832, Allowed; RCE filed Nov. 21, 2018.
U.S. Appl. No. 15/625,428, Allowed Dec. 4, 2018; RCE Filed.
U.S. Appl. No. 14/757,555, Patented as No. U.S. Pat. No. 9,711,174.
U.S. Appl. No. 15/380,336, Allowed; RCE filed Nov. 21, 2018.
U.S. Appl. No. 15/614,876, Pending.
U.S. Appl. No. 15/621,464, Pending.
U.S. Appl. No. 15/626,720, Allowed.
U.S. Appl. No. 15/854,383, Pending.
U.S. Appl. No. 15/848,173, Allowed.
U.S. Appl. No. 15/628,814, Pending.
U.S. Appl. No. 15/626,355, Pending.
U.S. Appl. No. 15/380,309, Pending.
U.S. Appl. No. 15/241,286, Patented as U.S. Pat. No. 10,026,433.
U.S. Appl. No. 15/920,563, Allowed.
U.S. Appl. No. 15/900,080, Pending.
U.S. Appl. No. 15/900,230, Pending.
U.S. Appl. No. 15/900,164, Pending.
U.S. Appl. No. 15/899,430, Pending.
U.S. Appl. No. 15/920,515, Pending.
U.S. Appl. No. 15/920,517, Pending.
U.S. Appl. No. 15/920,538, Pending.
U.S. Appl. No. 15/920,544, Pending.
U.S. Appl. No. 15/920,768, Allowed; RCE filed.
U.S. Appl. No. 16/009,603, Quayle Action issued (RCE filed).
U.S. Appl. No. 16/182,083 Pending (Not yet published; continuation of U.S. Appl. No. 15/920,768).
U.S. Appl. No. 16/100,289, Pending.
U.S. Appl. No. 15/900,106, Pending.
Notice of Allowance, dated Dec. 2, 2016, issued by the U.S. Patent and Trademark Office in U.S. Appl. No. 14/753,227.

(56) References Cited

OTHER PUBLICATIONS

Office Action dated Nov. 18, 2016 from U.S. Patent & Trademark Office in U.S. Appl. No. 14/753,227.
Office Action dated Aug. 15, 2016 from U.S. Patent & Trademark Office in U.S. Appl. No. 14/753,227.
Office Action dated Feb. 4, 2016 from U.S. Patent & Trademark Office in U.S. Appl. No. 14/753,227.
Notice of Allowance, dated Jul. 12, 2017, issued by the U.S. Patent and Trademark Office in U.S. Appl. No. 15/388,864.
Office Action dated Jun. 9, 2017 from U.S. Patent & Trademark Office in U.S. Appl. No. 15/388,864.
Office Action dated Apr. 26, 2017 from U.S. Patent & Trademark Office in U.S. Appl. No. 15/388,864.
Office Action dated Jun. 7, 2018 from U.S. Patent & Trademark Office in U.S. Appl. No. 15/380,309.
Office Action dated Aug. 3, 2018 from U.S. Patent & Trademark Office in U.S. Appl. No. 15/388,911.
Office Action dated May 30, 2018 from U.S. Patent & Trademark Office in U.S. Appl. No. 15/388,911.
Office Action dated Nov. 16, 2016 which issued during the prosecution of U.S. Appl. No. 15/072,550.
Notice of Allowance dated Apr. 25, 2017 which issued during the prosecution of U.S. Appl. No. 15/072,550.
Notice of Allowance dated May 10, 2018 which issued during the prosecution of U.S. Appl. No. 15/615,871.
Notice of Allowance dated Mar. 16, 2018 which issued during the prosecution of U.S. Appl. No. 15/854,410.
U.S. Appl. No. 15/854,438, Allowed; RCE filed.
U.S. Appl. No. 15/920,563, Petition to Withdraw from Issue and RCE filed.
U.S. Appl. No. 15/920,768, QPIDS filed Dec. 10, 2018.
U.S. Appl. No. 16/009,603, Pending.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Office Action dated Nov. 14, 2018 in U.S. Appl. No. 16/100,289.
U.S. Appl. No. 15/422,944, Allowed; RCE filed Nov. 21, 2018.
U.S. Appl. No. 15/625,428, Pending.
U.S. Appl. No. 14/978,834, Patented as U.S. Appl. No. 9,721,605.
Office Action dated Oct. 5, 2017, which issued during the prosecution of U.S. Appl. No. 15/241,286.
Notice of Allowance dated Mar. 21, 2018, which issued during the prosecution of U.S. Appl. No. 15/241,286.
Office Action dated Oct. 5, 2017, which issued during the prosecution of U.S. Appl. No. 15/241,297.
Office Action dated Oct. 5, 2017, which issued during the prosecution of U.S. Appl. No. 15/241,631.
Office Action dated Oct. 5, 2017, which issued during the prosecution of U.S. Appl. No. 15/378,907.
Notice of Allowance dated Mar. 19, 2018, which issued during the prosecution of U.S. Appl. No. 15/378,907.
Notice of Allowance dated Mar. 27, 2018, which issued during the prosecution of U.S. Appl. No. 15/241,631.
Office Action dated Jan. 27, 2015 from the Japanese Patent Office in Japanese Application No. 2013-053543.
Notice of Allowance dated Mar. 14, 2018, which issued during the prosecution of U.S. Appl. No. 15/854,474.
Office Action dated Sep. 19, 2014, which issued during the prosecution of U.S. Appl. No. 14/209,065.
Office Action dated Mar. 13, 2015, which issued during the prosecution of U.S. Appl. No. 14/209,065.
Office Action dated Jul. 6, 2015, which issued during the prosecution of U.S. Appl. No. 14/209,065.
Office Action dated Sep. 10, 2015, which issued during the prosecution of U.S. Appl. No. 14/209,065.
Office Action dated Mar. 24, 2016, which issued during the prosecution of U.S. Appl. No. 14/209,065.
Notice of Allowance dated Oct. 6, 2016, which issued during the prosecution of U.S. Appl. No. 14/209,065.
Notice of Allowance dated Mar. 21, 2018, which issued during the prosecution of U.S. Appl. No. 15/241,297.
Notice of Allowance dated Jun. 28, 2017, which issued during the prosecution of U.S. Appl. No. 15/464,991.
Office Action dated Nov. 8, 2016 from the Japanese Patent Office in Japanese Application No. 2014-199022.
Office Action dated Feb. 25, 2016, which issued during the prosecution of U.S. Appl. No. 14/867,752.
Office Action dated Oct. 19, 2016, which issued during the prosecution of U.S. Appl. No. 14/867,752.
Office Action dated Mar. 16, 2017, which issued during the prosecution of U.S. Appl. No. 14/867,752.
Office Action dated Sep. 7, 2017, which issued during the prosecution of U.S. Appl. No. 14/867,752.
Office Action dated Jan. 31, 2018, which issued during the prosecution of U.S. Appl. No. 14/867,752.
Notice of Allowance dated Apr. 5, 2018, which issued during the prosecution of U.S. Appl. No. 14/867,752.
Office Action dated Apr. 19, 2018, which issued during the prosecution of U.S. Appl. No. 15/854,438.
Notice of Allowance dated Sep. 24, 2018, which issued during the prosecution of U.S. Appl. No. 15/854,438.
Notice of Allowance dated Jul. 13, 2018, which issued during the prosecution of U.S. Appl. No. 15/920,782.
Notice of Allowance dated Aug. 9, 2018, which issued during the prosecution of U.S. Appl. No. 15/920,563.
Office Action dated Nov. 28, 2018, which issued during the prosecution of U.S. Appl. No. 15/900,144.
Office Action dated Nov. 28, 2018, which issued during the prosecution of U.S. Appl. No. 15/900,080.
Office Action dated Sep. 28, 2018, which issued during the prosecution of U.S. Appl. No. 15/854,409.
Office Action dated Oct. 15, 2018, which issued during the prosecution of U.S. Appl. No. 15/854,403.
U.S. Appl. No. 15/625,428, Allowed Dec. 4, 2018.
U.S. Appl. No. 15/626,720, Pending.
U.S. Appl. No. 15/848,173, Pending.
U.S. Appl. No. 15/854,438, Allowed, Issue Fee not yet paid.
U.S. Appl. No. 15/920,563, RCE and Petition to Withdraw from Issue filed Dec. 17, 2018.
Notice of Allowance dated Apr. 16, 2019 in U.S. Appl. No. 15/625,428.
Notice of Allowance dated Apr. 30, 2019 in U.S. Appl. No. 15/380,309.
Notice of Allowance dated Mar. 18, 2019 in U.S. Appl. No. 15/628,814.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Notice of Allowance dated May 24, 2019 in U.S. Appl. No. 15/900,345.
Notice of Allowance dated May 24, 2019 in U.S. Appl. No. 16/143,646.
Notice of Allowance dated May 28, 2019 in U.S. Appl. No. 15/920,616.
Notice of Allowance dated May 29, 2019 in U.S. Appl. No. 15/900,160.

(56) References Cited

OTHER PUBLICATIONS

Notice of Allowance dated May 29, 2019 in U.S. Appl. No. 15/900,334.
Notice of Allowance dated May 30, 2019 in U.S. Appl. No. 15/900,230.
Office Action dated Apr. 15, 2019 in U.S. Appl. No. 16/182,083.
Office Action dated Apr. 16, 2019 in U.S. Appl. No. 16/232,165.
Office Action dated Apr. 23, 2019 in Japanese Application No. 2016-169851.
Office Action dated Apr. 23, 2019 in Japanese Application No. 2016-182230.
Office Action dated Apr. 4, 2019 in U.S. Appl. No. 16/184,312.
Office Action dated Feb. 5, 2019 in U.S. Appl. No. 16/038,339.
Notice of Allowance dated Mar. 18, 2019 in U.S. Appl. No. 15/626,355.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Office Action dated May 23, 2019 in U.S. Appl. No. 15/388,911.
Notice of Allowance dated Jun. 6, 2019 in U.S. Appl. No. 15/854,383.
Office Action dated Jun. 6, 2019 in U.S. Appl. No. 15/899,587.
Office Action dated Jun. 10, 2019 in U.S. Appl. No. 15/920,518.
Notice of Allowance dated Aug. 27, 2018 in U.S. Appl. No. 15/920,635.
Office Action dated Dec. 19, 2018 in U.S. Appl. No. 15/900,345.
Office Action dated Dec. 19, 2018 in U.S. Appl. No. 15/900,379.
Office Action dated Dec. 21, 2018 in U.S. Appl. No. 15/900,160.
Office Action dated Dec. 7, 2018 in U.S. Appl. No. 15/920,592.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Feb. 7, 2019 in U.S. Appl. No. 15/621,464.
Office Action dated Nov. 19, 2018 in U.S. Appl. No. 15/900,141.
Notice of Allowance dated Mar. 5, 2019 in U.S. Appl. No. 16/009,603.
Office Action dated Dec. 20, 2018 in U.S. Appl. No. 15/900,242.
Office Action dated Dec. 21, 2018 in U.S. Appl. No. 15/920,616.
Office Action dated Dec. 27, 2018 in U.S. Appl. No. 15/900,334.
Office Action dated Feb. 21, 2019 in U.S. Appl. No. 15/854,383.
Office Action dated Feb. 26, 2019 in Japanese Application No. 2016-123207.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Feb. 28, 2019 in U.S. Appl. No. 15/920,518.
"Introduction to TMR Magnetic Sensors", Anonymous, Mar. 12, 2015, MR Sensor Technology, pp. 1-5 (Year: 2015).
Office Action dated Mar. 5, 2019 in U.S. Appl. No. 15/443,026.
Office Action dated Mar. 6, 2019 in U.S. Appl. No. 15/854,403.
Office Action dated Mar. 7, 2019 in U.S. Appl. No. 15/854,439.
Office Action dated Dec. 20, 2018 in U.S. Appl. No. 15/900,106.
Notice of Allowance dated Mar. 13, 2019 in U.S. Appl. No. 16/100,289.
U.S. Appl. No. 15/422,944, Allowed; QPIDS filed.
U.S. Appl. No. 15/624,897, Pending.
U.S. Appl. No. 15/624,792, Pending.
U.S. Appl. No. 15/626,832, Pending.
U.S. Appl. No. 15/620,916, Pending.
U.S. Appl. No. 15/626,720, Allowed; QPIDS filed.
U.S. Appl. No. 15/854,439, Pending.
U.S. Appl. No. 15/628,814, Allowed; RCE filed.
U.S. Appl. No. 15/626,355, Allowed; RCE filed.
U.S. Appl. No. 15/854,438, Allowed.
U.S. Appl. No. 15/854,409, Allowed.
U.S. Appl. No. 15/900,144, Pending.
U.S. Appl. No. 15/920,768, Allowed.
U.S. Appl. No. 16/009,603, Allowed.
U.S. Appl. No. 16/182,083, Pending (Continuation of U.S. Appl. No. 15/920,768).
U.S. Appl. No. 16/100,289, Allowed; RCE filed.
U.S. Appl. No. 15/900,412, Patented as U.S. Pat. No. 10,062,403.
U.S. Appl. No. 15/900,141, Pending.
U.S. Appl. No. 15/920,592, Pending.
U.S. Appl. No. 16/160,377, Pending.
U.S. Appl. No. 16/184,312, Pending.
Notice of Allowance dated Jul. 16, 2019 in U.S. Appl. No. 15/900,144.
Notice of Allowance dated Jul. 31, 2019 in U.S. Appl. No. 16/100,289.
Notice of Allowance dated Jul. 31, 2019 in U.S. Appl. No. 16/143,646.
Notice of Allowance dated Jun. 25, 2019 in U.S. Appl. No. 15/620,916.
Notice of Allowance dated Jun. 27, 2019 in U.S. Appl. No. 15/854,439.
Office Action dated Jul. 16, 2019 in Japanese Application No. 2016-124933.
Office Action dated Jun. 25, 2019 in Japanese Application No. 2015-245144.
U.S. Appl. No. 15/422,821, Allowed.
U.S. Appl. No. 15/619,012, Pending.
U.S. Appl. No. 15/625,428, Allowed.
U.S. Appl. No. 15/380,336, Pending.
U.S. Appl. No. 15/614,876, Allowed.
U.S. Appl. No. 15/621,464, Allowed.
U.S. Appl. No. 15/854,383, Allowed.
U.S. Appl. No. 15/848,173, Allowed; QPIDS filed.
U.S. Appl. No. 15/690,400, Pending.
U.S. Appl. No. 15/690,906, Pending.
U.S. Appl. No. 15/627,696, Pending.
U.S. Appl. No. 15/388,911, Pending.
U.S. Appl. No. 15/380,309, Allowed.
U.S. Appl. No. 15/854,438, Allowed; QPIDS filed.
U.S. Appl. No. 15/854,409, Allowed; QPIDS filed.
U.S. Appl. No. 15/920,563, Allowed; QPIDS filed.
U.S. Appl. No. 15/920,533, Pending.
U.S. Appl. No. 15/900,080, Allowed.
U.S. Appl. No. 15/900,230, Allowed.
U.S. Appl. No. 15/900,164, Allowed.
U.S. Appl. No. 15/920,518, Pending.
U.S. Appl. No. 15/899,430, Allowed.
U.S. Appl. No. 15/920,515, Allowed.
U.S. Appl. No. 15/920,517, Allowed.
U.S. Appl. No. 15/920,538, Allowed.
U.S. Appl. No. 15/920,544, Allowed.
U.S. Appl. No. 15/920,768, Allowed; QPIDS filed.
U.S. Appl. No. 16/232,165, Pending (Continuation of U.S. Appl. No. 15/854,438).
U.S. Appl. No. 15/900,106, Allowed.
U.S. Appl. No. 15/900,160, Allowed.
U.S. Appl. No. 15/900,345, Allowed.
U.S. Appl. No. 15/900,379, Allowed.
U.S. Appl. No. 15/920,616, Allowed.
U.S. Appl. No. 15/900,334, Allowed.
U.S. Appl. No. 15/920,592, Allowed.
U.S. Appl. No. 16/038,339, Allowed.

(56) References Cited

OTHER PUBLICATIONS

U.S. Appl. No. 16/044,574, Allowed.
Office Action dated Aug. 27, 2019 in Japanese Application No. 2016-254428.
Office Action dated Aug. 27, 2019 in Japanese Application No. 2016-254430.
Office Action dated Aug. 27, 2019 in Japanese Application No. 2016-254432.
Office Action dated Aug. 6, 2019 in Japanese Application No. 2016-254421.
Office Action dated Aug. 6, 2019 in Japanese Application No. 2016-254427.
Office Action dated Sep. 17, 2019 in Japanese Application No. 2017-029499.
Office Action dated Sep. 3, 2019 in Japanese Application No. 2016-254434.
U.S. Appl. No. 15/052,115, Patented as U.S. Pat. No. 9,704,527.
U.S. Appl. No. 15/218,190, Patented as U.S. Pat. No. 9,721,606.
U.S. Appl. No. 15/422,821, Allowed; QPIDS filed.
U.S. Appl. No. 15/422,944, Patented as U.S. Pat. No. 10,347,279.
U.S. Appl. No. 15/466,143, Patented as U.S. Pat. No. 9,837,116.
U.S. Appl. No. 15/619,012, Allowed.
U.S. Appl. No. 15/624,897, Allowed.
U.S. Appl. No. 15/624,792, Allowed.
U.S. Appl. No. 15/626,832, Allowed.
U.S. Appl. No. 15/625,428, Patented as U.S. Pat. No. 10,403,318.
U.S. Appl. No. 14/978,834, Patented as U.S. Pat. No. 9,721,605.
U.S. Appl. No. 14/757,555, Patented as U.S. Pat. No. 9,711,174.
U.S. Appl. No. 15/197,046, Patented as U.S. Pat. No. 9,721,607.
U.S. Appl. No. 15/380,336, Allowed.
U.S. Appl. No. 15/614,876, Patented as U.S. Pat. No. 10,431,248.
U.S. Appl. No. 15/620,916, Allowed.
U.S. Appl. No. 15/621,464, Patented as U.S. Pat. No. 10,431,249.
U.S. Appl. No. 15/626,720, Patented as U.S. Pat. No. 10,347,280.
U.S. Appl. No. 15/854,383, Patented as U.S. Pat. No. 10,438,628.
U.S. Appl. No. 15/854,507, Patented as U.S. Pat. No. 9,984,716.
U.S. Appl. No. 15/854,439, Allowed.
U.S. Appl. No. 15/854,506, Patented as U.S. Pat. No. 10,008,230.
U.S. Appl. No. 15/848,173, Patented as U.S. Pat. No. 10,403,320.
U.S. Appl. No. 15/628,814, Allowed.
U.S. Appl. No. 15/690,400, Allowed.
U.S. Appl. No. 15/690,906, Allowed.
U.S. Appl. No. 15/626,355, Allowed.
U.S. Appl. No. 15/627,696, Allowed.
U.S. Appl. No. 14/870,618, Patented as U.S. Pat. No. 9,959,894.
U.S. Appl. No. 15/388,911, Allowed.
U.S. Appl. No. 14/753,227, Patented as U.S. Pat. No. 9,601,146.
U.S. Appl. No. 15/380,309, Patented as U.S. Pat. No. 10,403,319.
U.S. Appl. No. 15/388,864, Patented as U.S. Pat. No. 9,773,519.
U.S. Appl. No. 15/072,550, Patented as U.S. Pat. No. 9,704,525.
U.S. Appl. No. 15/615,871, Patented as U.S. Pat. No. 10,074,393.
U.S. Appl. No. 15/854,410, Patented as U.S. Pat. No. 9,972,351.
U.S. Appl. No. 15/378,907, Patented as U.S. Pat. No. 9,984,710.
U.S. Appl. No. 15/241,631, Patented as U.S. Pat. No. 10,026,435.
U.S. Appl. No. 14/209,065, Patented as U.S. Pat. No. 9,530,444.
U.S. Appl. No. 15/854,474, Patented as U.S. Pat. No. 9,978,414.
U.S. Appl. No. 15/854,403, Pending.
U.S. Appl. No. 15/241,297, Patented as U.S. Pat. No. 10,026,434.
U.S. Appl. No. 15/241,286, Patented as U.S. Pat. No. 10,026,433[1].
U.S. Appl. No. 15/464,991, Patented as U.S. Pat. No. 9,779,772.
U.S. Appl. No. 14/867,752, Patented as U.S. Pat. No. 10,026,430.
U.S. Appl. No. 15/854,438, Patented as U.S. Pat. No. 10,373,633.
U.S. Appl. No. 15/854,409, Pending.
U.S. Appl. No. 15/443,026, Pending.
U.S. Appl. No. 15/920,782, Patented as U.S. Pat. No. 10,134,433.
U.S. Appl. No. 15/920,563, Patented as U.S. Pat. No. 10,360,937.
U.S. Appl. No. 15/920,533, Patented as U.S. Pat. No. 10,431,251.
U.S. Appl. No. 15/900,144, Allowed.
U.S. Appl. No. 15/900,080, Patented as U.S. Pat. No. 10,460,756.
U.S. Appl. No. 15/900,230, Patented as U.S. Pat. No. 10,431,250.
U.S. Appl. No. 15/900,164, Patented as U.S. Pat. No. 10,424,330.
U.S. Appl. No. 15/920,518, Allowed.
U.S. Appl. No. 15/899,587, Pending.
U.S. Appl. No. 15/899,430, Patented as U.S. Pat. No. 10,403,314.
U.S. Appl. No. 15/920,515, Patented as U.S. Pat. No. 10,410,665.
U.S. Appl. No. 15/920,517, Patented as U.S. Pat. No. 10,395,685.
U.S. Appl. No. 15/920,538, Patented as U.S. Pat. No. 10,403,317.
U.S. Appl. No. 15/920,544, Patented as U.S. Pat. No. 10,410,666.
U.S. Appl. No. 15/920,768, Patented as U.S. Pat. No. 10,373,639.
U.S. Appl. No. 16/009,603, Patented as U.S. Pat. No. 10,366,721.
U.S. Appl. No. 16/182,083, Allowed (Continuation of U.S. Appl. No. 15/920,768).
U.S. Appl. No. 15/705,531, Pending.
U.S. Appl. No. 16/232,165, Allowed (Continuation of U.S. Appl. No. 15/854,438).
U.S. Appl. No. 16/100,289, Allowed.
U.S. Appl. No. 16/038,669, Pending.
U.S. Appl. No. 15/900,106, Patented as U.S. Pat. No. 10,438,624.
U.S. Appl. No. 15/900,412, Patented as U.S. Pat. No. 10,062,403[2].
U.S. Appl. No. 15/900,141, Allowed.
U.S. Appl. No. 15/900,160, Patented as U.S. Pat. No. 10,438,625.
U.S. Appl. No. 15/900,345, Allowed; QPIDS filed.
U.S. Appl. No. 15/900,379, Patented as U.S. Pat. No. 10,453,488.
U.S. Appl. No. 16/012,018, Pending.
U.S. Appl. No. 15/920,616, Patented as U.S. Pat. No. 10,438,623.
U.S. Appl. No. 15/900,242, Allowed.
U.S. Appl. No. 15/900,334, Patented as U.S. Pat. No. 10,438,621.
U.S. Appl. No. 15/920,592, Patented as U.S. Pat. No. 10,403,312.
U.S. Appl. No. 15/920,635, Patented as U.S. Pat. No. 10,170,144.
U.S. Appl. No. 16/160,377, Allowed.
U.S. Appl. No. 15/443,094, Pending.
U.S. Appl. No. 15/442,961, Pending.
U.S. Appl. No. 16/038,687, Pending.
U.S. Appl. No. 16/038,514, Pending.
U.S. Appl. No. 16/038,545, Pending.
U.S. Appl. No. 16/037,596, Pending.
U.S. Appl. No. 16/038,771, Pending.
U.S. Appl. No. 16/037,564, Pending.
U.S. Appl. No. 16/038,339, Patented as U.S. Pat. No. 10,403,316.
U.S. Appl. No. 16/037,573, Pending.
U.S. Appl. No. 16/037,681, Pending.
U.S. Appl. No. 16/038,884, Pending.
U.S. Appl. No. 16/038,847, Pending.
U.S. Appl. No. 16/044,574, Patented as U.S. Pat. No. 10,438,622.
U.S. Appl. No. 16/142,560, Pending.
U.S. Appl. No. 16/184,312, Allowed.
U.S. Appl. No. 16/143,646, Allowed.
U.S. Appl. No. 16/144,428, Pending.
U.S. Appl. No. 16/143,747, Pending.
U.S. Appl. No. 16/440,161, Pending.
U.S. Appl. No. 16/144,605, Pending.
U.S. Appl. No. 15/854,397, Pending.
U.S. Appl. No. 15/854,329, Patented as U.S. Pat. No. 9,984,712.
U.S. Appl. No. 14/838,663, Abandoned.

* cited by examiner

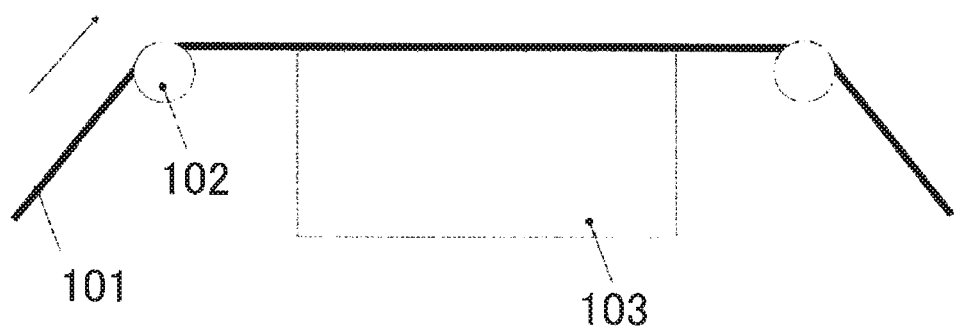

MAGNETIC TAPE HAVING CHARACTERIZED MAGNETIC LAYER AND MAGNETIC TAPE DEVICE

CROSS-REFERENCE TO RELATED APPLICATIONS

This application claims priority under 35 U.S.C 119 to Japanese Patent Application No. 2015-195165 filed on Sep. 30, 2015 and Japanese Patent Application No. 2016-190494 filed on Sep. 29, 2016. Each of the above applications is hereby expressly incorporated by reference, in its entirety.

BACKGROUND OF THE INVENTION

Field of the Invention

The present invention relates to a magnetic tape and a method of manufacturing the same.

Discussion of the Background

Magnetic recording media come in the form of tapes and disks. Tape-shaped magnetic recording media—that is, magnetic tapes—are primarily employed for storage applications such as data backup. Signal recording on and reproduction from magnetic tapes is usually conducted by causing the surface of a magnetic tape being run within a drive to slide against (come into contact with) a magnetic head (also referred to hereinafter simply as a "head").

When repeated running is conducted in a state with a high coefficient of friction during sliding of the surface of the magnetic tape and the head, a drop in running stability and output fluctuation are sometimes observed. This is thought to be caused by the head sticking to the surface of the magnetic tape, scratches imparted to the surface of the magnetic tape, and the like. Accordingly, to inhibit the occurrence of such phenomena, controlling the state in which lubricant is present on the surface of the magnetic tape (Japanese Unexamined Patent Publication (KOKAI) No. 2012-43495 or English language family members US2012/045664A1, U.S. Pat. No. 9,311,946 (B2) and US2016/180875), controlling the surface shape of the magnetic tape (Japanese Unexamined Patent Publication (KOKAI) No. 2011-48878 or English language family members US2011/052908A1 and U.S. Pat. No. 8,535,817), and the like have been proposed. The contents of the above publications are expressly incorporated herein by reference in their entirety.

SUMMARY OF THE INVENTION

It is always desirable for magnetic tapes to have good electromagnetic characteristics. Accordingly, it is desirable to both inhibit the above sticking and scratching and enhance the electromagnetic characteristics. However, in recent years, magnetic tapes have been required to afford highly reliable use even in severe use environments at higher conveyance (running) speeds and/or for longer periods. To afford good electromagnetic characteristics and inhibit sticking and scratching with such repeated running under severe use conditions and for extended periods, further improvement is needed in conventional magnetic tapes.

An aspect of the present invention provides for a magnetic tape in which sticking of the magnetic tape surface and the magnetic head and scratching of the surface of the magnetic tape with repeated running are inhibited and in which good electromagnetic characteristics are achieved.

An aspect of the present invention relates to:

a magnetic tape having a magnetic layer containing ferromagnetic powder and binder on a nonmagnetic support, wherein the magnetic layer contains a fatty acid ester;

the full width at half maximum of the spacing distribution as measured by optical interferometry on the magnetic layer side surface of the magnetic tape before vacuum heating the magnetic tape is greater than 0 nm but less than or equal to 5.0 nm;

the full width at half maximum of the spacing distribution as measured by optical interferometry on the magnetic layer side surface of the magnetic tape after vacuum heating the magnetic tape is greater than 0 nm but less than or equal to 5.0 nm; and the difference between the spacing $S_{after}$ as measured by optical interferometry on the magnetic layer side surface of the magnetic tape after vacuum heating the magnetic tape and the spacing $S_{before}$ as measured by optical interferometry on the magnetic layer side surface of the magnetic tape before vacuum heating the magnetic tape, $S_{after}-S_{before}$, is greater than 0 nm but less than or equal to 8.0 nm.

The above magnetic tape can afford good electromagnetic characteristics and can inhibit scratching of the surface of the magnetic tape and sticking of the magnetic head to the surface of the magnetic tape with repeated running. The presumptions of the present inventors in this regard will be set forth further below.

In the present invention and present specification, the "vacuum heating" of a magnetic tape is conducted by maintaining the magnetic tape for 24 hours in an environment of an atmospheric temperature of 70° C. to 90° C. and a pressure of greater than or equal to 200 Pa but less than or equal to 0.01 MPa.

In the present invention and present specification, the spacing that is measured by optical interferometry on the magnetic layer side surface of the magnetic tape is a value measured by the following method.

A magnetic tape and a transparent, sheet-shaped member (such as a sheet of glass) are superposed with the magnetic layer side surface of the magnetic tape facing the transparent sheet-shaped member. In this state, a pressing member is caused to apply a pressure of $5.05 \times 10^4$ N/m (0.5 atm) to the sheet-shaped member from the side opposite to the side at which the sheet-shaped member faces with the magnetic layer side surface of the magnetic tape. In this state, light is irradiated onto the magnetic layer side surface of the magnetic tape through the transparent sheet-shaped member (scope of irradiation: 150,000 to 200,000 µm$^2$). The spacing (distance) between the magnetic layer side surface of the magnetic tape and the surface of the transparent sheet-shaped member is obtained based on the strength of the interfering light (for example, the contrast in an interference fringe image) generated by the difference in the optical paths of the light reflecting off the magnetic layer side surface of the magnetic tape and the light reflecting off the surface of the transparent sheet-shaped member on the magnetic tape side. The light that is irradiated is not specifically limited. When the light that is irradiated is light having emission wavelengths over a relatively broad range of wavelengths, such as white light containing multiple wavelengths, a member having the function of selectively cutting light of a specific wavelength or light outside a specific wavelength range, such as an interference filter, is disposed between the transparent sheet-shaped member and the light-receiving element receiving reflected light, and light of some portion of the wavelength or portion of the wavelength range of the reflected light is selectively caused to enter the light-receiving element. When the light that is irradiated is light having a single emission peak (so-called "monochromic light"), this member need not be employed. The wavelength of the light caused to enter the light-receiving element, for example, falls within a range of 500 nm to 700 nm, but is not specifically limited. It suffices for the transparent sheet-shaped member to be a member having a transparence such that it passes the light that is irradiated to a degree making it possible to irradiate the magnetic tape through the member and obtain interfering light.

The above measurement can be conducted with a commercial tape spacing analyzer (TSA) made by Micro Physics Corp., for example. The spacing measurement in Examples was conducted with a tape spacing analyzer made by Micro Physics Corp.

The "full width at half maximum" of the spacing distribution in the present invention and present specification refers to the full width at half maximum (FWHM) when the interference fringe image obtained by the above spacing measurement is separated into 300,000 points, the spacing of each point (the distance between the magnetic layer side surface of the magnetic tape and the surface of the sheet-shaped member on the magnetic tape side) is determined, the values are used to plot a histogram, and the histogram is fit to a Gaussian distribution.

The difference $S_{after} S_{before}$ refers to a value obtained by subtracting the most frequent value before vacuum heating from the most frequent value after vacuum heating at the above 300,000 points.

In one embodiment, the centerline average surface roughness Ra measured on the magnetic layer side surface of the magnetic tape is less than or equal to 2.8 nm. In the present invention and the present specification, the tens "centerline average surface roughness Ra" refers to a value that is measured for an area of 40 µm×40 µm with an atomic force microscope (AFM). The measurement conditions set forth below are an example of the measurement conditions. The centerline average surface roughness Ra in Examples described further below is a value that was measured under the following measurement conditions.

An area 40 µm×40 µm of the magnetic layer side surface of the magnetic tape is measured with an AFM (Nanoscope 4 made by Veeco Corp.). The scan rate (probe displacement rate) is 40 µm/sec. and the resolution was 512 pixels×512 pixels.

In one embodiment, the centerline average surface roughness Ra that is measured on the magnetic layer side surface of the magnetic tape is less than or equal to 2.5 nm.

In one embodiment, the centerline average surface roughness Ra that is measured on the magnetic layer side surface of the magnetic tape is less than or equal to 2.0 nm.

In one embodiment, the magnetic layer contains nonmagnetic filler. The term "nonmagnetic filler" is synonymous with nonmagnetic powder. In the present invention and present specification, the term "nonmagnetic powder" means an aggregation of multiple nonmagnetic particles. The term "aggregation" is not limited to forms in which the constituent particles are in direct contact, but also includes forms in which binder, additives, or the like are present between the particles. The term "particles" is also sometimes employed to denote powder. The above points are also applied to the various powders in the present invention and present specification, such as ferromagnetic powder.

In one embodiment, the nonmagnetic filler is colloidal particles. In the present invention and present specification, the term "colloidal particles" refers to particles that are capable of dispersing, without precipitating, to form a colloidal dispersion when added to organic solvent in the form of at least one selected from the group consisting of methyl ethyl ketone, cyclohexanone, toluene, ethyl acetate, and mixed solvents of two or more of the same in any mixing ratio, in a quantity of 1 g per 100 mL of organic solvent.

In one embodiment, the colloidal particles are silica colloidal particles.

In one embodiment, the nonmagnetic filler is carbon black.

In one embodiment, the magnetic tape contains a nonmagnetic layer containing nonmagnetic powder and binder between the nonmagnetic support and the magnetic layer.

In one embodiment, the magnetic layer further contains a fatty acid.

A further aspect of the present invention relates to:

a method of manufacturing the above magnetic tape, including:

coating and drying a magnetic layer-forming composition containing ferromagnetic powder, binder, and a fatty acid ester on a nonmagnetic support to form a magnetic layer; and applying vibration to the magnetic layer that has been formed.

An aspect of the present invention can provide a magnetic tape that affords good electromagnetic characteristics and in which sticking of the surface of the magnetic tape and the magnetic head and scratching of the surface of the magnetic tape with repeated running are inhibited.

Other exemplary embodiments and advantages of the present invention may be ascertained by reviewing the present disclosure and the accompanying drawing(s).

BRIEF DESCRIPTION OF THE DRAWINGS

The present invention will be described in the following text by the exemplary, non-limiting embodiments shown in the drawing, wherein:

FIG. 1 is a schematic drawing of vibration-imparting device employed in Examples.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

The magnetic tape according to an aspect of the present invention is a magnetic tape having a magnetic layer containing ferromagnetic powder and binder on a nonmagnetic support, wherein the magnetic layer contains a fatty acid ester;

the full width at half maximum of the spacing distribution as measured by optical interferometry on the magnetic layer side surface of the magnetic tape before vacuum heating the magnetic tape (also referred to as the "$FWHM_{before}$") is greater than 0 nm but less than or equal to 5.0 nm;

the full width at half maximum of the spacing distribution as measured by optical interferometry on the magnetic layer side surface of the magnetic tape after vacuum heating the magnetic tape (also referred to as the "$FWHM_{after}$") is greater than 0 nm but less than or equal to 5.0 nm; and the difference between the spacing $S_{after}$ as measured by optical interferometry on the magnetic layer side surface of the magnetic tape after vacuum heating the magnetic tape and the spacing $S_{before}$ as measured by optical interferometry on the magnetic layer side surface of the magnetic tape before vacuum heating the magnetic tape, $S_{after}-S_{before}$, is greater than 0 nm but less than or equal to 8.0 nm.

The present inventors presume the following with regard to the above magnetic tape.

(1) When recording signals on and reproducing them from magnetic tapes, protrusions that are present on the surface of the magnetic tape usually come into contact with the head (in what is referred to as "actual contact"). However, portions that are lower than the protrusions on the surface of the magnetic tape (referred to as "base portions" hereinafter) either do not come into contact with the head or do so at low frequency. The present inventors presume that the above spacing is a value that serves as an indicator of the distance between the base portion and the head. However, when lubricant that is contained in the magnetic layer forms a liquid film on the surface of the magnetic tape, the presence of the liquid film between the base portion and the head is thought to narrow the spacing by the thickness of the liquid film. Lubricants can generally be roughly divided into fluid lubricants and boundary lubricants. The fatty acid ester that is contained in the magnetic layer of the above magnetic tape is a component that can function as a fluid lubricant. Fluid lubricants themselves are thought to form a liquid film on the surface of the magnetic tape (magnetic layer side surface), thereby playing the role of protecting the surface of the magnetic tape. The present inventors presume that the presence of a liquid film of fatty acid ester on the surface of the magnetic tape relates to protecting, and inhibiting scratching of, the surface of the magnetic tape. However, when an excess quantity of fatty acid ester is present on the surface of the magnetic tape, a meniscus (liquid bridge) is formed between the head and the surface of the magnetic tape by the fatty acid ester, which is thought to cause sticking.

With regard to the above points, the present inventors focused on components that had properties that were developed by the vacuum heating of fatty acid esters, and adopted the difference $S_{after}-S_{before}$ between the spacing after vacuum heating (a state in which the liquid film of fatty acid ester is removed by volatilization) and the spacing before vacuum heating (a state in which the liquid film of fatty acid ester is present) as an indicator of the thickness of the liquid film formed by fatty acid ester on the surface of the magnetic tape. The present inventors presume that keeping a liquid film of fatty acid ester present on the surface of the magnetic tape so that the above value is greater than 0 nm but less than or equal to 8.0 nm relates to preventing scratching while inhibiting sticking.

(2) The lower the value of the fall width at half maximum in the above spacing distribution, the less variation in the spacing value as measured in various parts of the surface of the magnetic tape there will be. The present inventors conducted extensive research. As a result, they came to presume that increasing the uniformity of height of the protrusions present on the surface of the magnetic tape and increasing the uniformity of thickness of the liquid film of fatty acid ester could be effective ways of increasing uniformity in the state of contact between the head and the surface of the magnetic tape in order to inhibit scratching and sticking of the surface of the magnetic tape and the head during running. The present inventors also presume that increasing the uniformity in the state of contact between the head and the surface of the magnetic tape can be an effective way to enhance the electromagnetic characteristics because it relates to inhibiting the drop in the electromagnetic characteristics due to spacing fluctuation.

In this regard, the reason for the variation in the spacing value is thought to be variation in the thickness of the liquid film of fatty acid ester and variation in the height of the protrusions on the surface of the magnetic tape. The present inventors presume that the spacing distribution $FWHM_{before}$ before vacuum heating, that is, measured in a state when the liquid film of fatty acid ester is present on the surface of the magnetic tape, increases with variation in the height of the protrusions and with variation in the thickness of the liquid film of fatty acid ester, and especially, variation in the thickness of the liquid film of fatty acid ester has the greater effect. The present inventors presume that the spacing distribution $FWHM_{after}$ after vacuum heating, that is, measured in a state following removal of the liquid film of fatty acid ester from the surface of the magnetic tape, increases with variation in the height of the protrusions. That is, the present inventors presume that to the degree both spacing distributions $FWHM_{before}$ and $FWHM_{after}$ are low, the lower the variation in the thickness of the liquid film of fatty acid ester on the surface of the magnetic tape and the variation in the height of the protrusions that are signified. It has become clear that by increasing the uniformity of thickness of the liquid film, of fatty acid ester and the height of the protrusions so that both spacing distributions $FWHM_{before}$ and $FWHM_{after}$ are kept to greater than 0 nm but less than or equal to 5.0 nm, it becomes possible to inhibit scratching and sticking of the magnetic tape surface and head during running and to enhance the electromagnetic characteristics. Although Japanese Unexamined Patent Publication (KOKAI) No. 2012-43495 set forth above describes the spacing, Japanese Unexamined Patent Publication (KOKAI) No. 2012-43495 provides neither a description relating to the spacing or spacing distribution before and after vacuum heating nor a description suggesting controlling the spacing distribution.

However, the above are merely presumptions by the present inventors and do not limit the present invention in any way.

The above magnetic tape will be described in greater detail.

<Spacing Distributions $FWHM_{before}$ and $FWHM_{after}$>

The spacing distribution before vacuum heating, $FWHM_{before}$, and the spacing distribution after vacuum heating, $FWHM_{after}$, that are measured for the above magnetic tape both are greater than 0 nm but less than or equal to 5.0 nm. From the perspective of further inhibiting scratching and sticking of the magnetic tape layer and the head during running, spacing distributions $FWHM_{before}$ and $FWHM_{after}$ are desirably less than or equal to 4.5 nm, preferably less than or equal to 4.0 nm, more preferably less than or equal to 3.5 nm, still more preferably less than or equal to 3.0 nm, yet more preferably less than or equal to 2.5 nm, and even more preferably, less than or equal to 2.0 nm. The $FWHM_{before}$ and $FWHM_{after}$ are, for example, greater than or equal to 0.5 nm, but since the lower the value the better from the perspective of inhibiting scratching and sticking of the magnetic tape layer and the head during running, they can be lower than this value.

The spacing distribution before vacuum heating $FWHM_{before}$ can be reduced primarily by reducing the variation in thickness of the liquid film of fatty acid ester. Examples of specific means will be given further below. Additionally, the spacing distribution after vacuum heating $FWHM_{after}$ can be reduced by reducing variation in the height of the protrusions on the surface of the magnetic tape. To this end, the state in which powder components contained in the magnetic layer—for example, the nonmagnetic filler described in detail further below—are present in the magnetic layer is desirably controlled. Examples of specific means will be set forth further below.

<Difference $S_{after}-S_{before}$>

The difference $S_{after}-S_{before}$ in the spacing before and after vacuum heating that is measured on the above magnetic tape is greater than 0 nm but less than or equal to 8.0 nm. From the perspective of further inhibiting scratching, the difference $S_{after}-S_{before}$ is desirably greater than or equal to 0.1 nm, preferably greater than or equal to 1.0 nm. From the perspective of further inhibiting sticking of the surface of the magnetic tape and the head during running, the difference $S_{after}-S_{before}$ is desirably less than or equal to 7.0 nm, preferably less than or equal to 6.0 nm, more preferably less than or equal to 5.0 nm, still more preferably less than or equal to 4.0 nm, yet more preferably less than or equal to 3.5 nm, and even more preferably, less than or equal to 3.0 nm. The difference $S_{after}-S_{before}$ can be controlled by means of the quantity of fatty acid ester that is added to the magnetic layer-forming composition. For magnetic tapes having a nonmagnetic layer between the nonmagnetic support and magnetic layer, it can also be controlled by means of the quantity of fatty acid ester added to the nonmagnetic layer-forming composition. This is because the nonmagnetic layer can play the roles of holding lubricant and supplying it to the magnetic layer, and thus the fatty acid ester contained in the nonmagnetic layer can migrate to the magnetic layer side and can be present on the surface of the magnetic tape.

<Magnetic Layer>

(Fatty Acid Ester)

The above magnetic tape contains a fatty acid ester in the magnetic layer. One or more types of fatty acid esters can be contained. Examples of fatty acid esters are esters of lauric acid, myristic acid, palmitic acid, stearic acid, oleic acid, linoleic acid, linolenic acid, behenic acid, erucic acid, and eraidic acid. Specific examples are butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

The content of fatty acid ester in the magnetic layer is, for example, 0.1 to 10.0 weight parts, desirably 1.0 to 7.0 weight parts, per 100.0 weight parts of ferromagnetic powder. When employing two or more types of fatty acid ester as the fatty acid ester, the content refers to the combined content thereof. Unless specifically stated otherwise, the same is applied to the contents of other components in the present invention and present specification.

When a nonmagnetic layer is present between the nonmagnetic support and the magnetic layer in the above magnetic tape, the content of fatty acid ester in the nonmagnetic layer is, for example, 0 to 10.0 weight parts, desirably 0.1 to 8.0 weight parts, per 100.0 weight parts of nonmagnetic powder.

(Other Lubricants)

The above magnetic tape contains one type of lubricant in the form of a fatty acid ester. Lubricants other than fatty acid esters can be optionally contained in the magnetic layer and/or nonmagnetic layer. As stated above, lubricants contained in the nonmagnetic layer are capable of migrating to the magnetic layer side and being present on the surface of the magnetic tape. Fatty acids are an example of lubricants that are optionally contained. Fatty acid amides are further examples. While fatty acid esters are components that can function as fluid lubricants, fatty acids and fatty acid amides are components that can function as boundary lubricants. Boundary lubricants are thought to adsorb to the surface of powder (such as ferromagnetic powder) and form a strong lubricating film, thereby lowering contact friction.

Examples of fatty acids are lauric acid, myristic acid, palmitic acid, stearic acid, oleic acid, linoleic acid, linolenic acid, behenic acid, erucic acid, and eraidic acid. Stearic acid, myristic acid, and palmitic acid are desirable. Stearic acid is preferred. The fatty acid can be contained in the form of a salt such as a metal salt in the magnetic layer.

Examples of fatty acid amides are the amides of the various fatty acids set forth above. Examples are amide laurate, amide myristate, amide palmitate, and amide stearate.

With regard to fatty acids and fatty acid derivatives (such as amides and esters), the fatty acid-derived portion of the fatty acid derivative desirably has a structure that is identical or similar to any fatty acid with which it is employed in combination. For example, when employing a fatty acid in the form of stearic acid, it is desirable to employ a stearic acid ester or amide stearate.

The content of the fatty acid in the magnetic layer is, for example, 0 to 10.0 weight parts, desirably 0.1 to 10.0 weight parts, and preferably, 1.0 to 7.0 weight parts, per 100.0 weight parts of ferromagnetic powder. The content of fatty acid amide in the magnetic layer is, for example, 0 to 3.0 weight parts, desirably 0 to 2.0 weight parts, and preferably, 0 to 1.0 weight parts, per 100 weight parts of ferromagnetic powder.

When a nonmagnetic layer is present between the nonmagnetic support and magnetic layer in the above magnetic tape, the content of fatty acid in the nonmagnetic layer is, for example, 0 to 10.0 weight parts, desirably 1.0 to 10.0 weight parts, preferably 1.0 to 7.0 weight parts, per 100.0 weight parts of nonmagnetic powder. The content of fatty acid amide in the nonmagnetic layer is, for example, 0 to 3.0 weight parts, desirably 0 to 1.0 weight parts, per 100.0 weight parts of nonmagnetic powder.

(Ferromagnetic Powder)

The various powders that are commonly employed as ferromagnetic powders in the magnetic layer of various magnetic recording media can be employed as the ferromagnetic powder. The use of a ferromagnetic powder of small average particle size is desirable from the perspective of increasing the recording density of the magnetic tape. For this reason, it is desirable to employ ferromagnetic powder with an average particle size of less than or equal to 50 nm as the ferromagnetic powder. From the perspective of stability of magnetization, the average particle size of the ferromagnetic powder is desirably greater than or equal to 10 nm.

Ferromagnetic hexagonal ferrite powder is a specific example of desirable ferromagnetic powder. From the perspectives of achieving higher density recording and magnetization stability, the average particle size (for example, average plate diameter) of ferromagnetic hexagonal ferrite powder desirably ranges from 10 nm to 50 nm, preferably 20 nm to 50 nm. Reference can be made to Japanese Unexamined Patent Publication (KOKAI) No. 2011-225417, paragraphs 0012 to 0030, Japanese Unexamined Patent Publication (KOKAI) No. 2011-216149, paragraphs 0134 to 0136, and Japanese Unexamined Patent Publication (KOKAI) No. 2012-204726, paragraphs 0013 to 0030, for details on ferromagnetic hexagonal ferrite powder. The contents of the above publications are expressly incorporated herein by reference in their entirety.

Ferromagnetic metal powder is also a specific example of desirable ferromagnetic powder. From the perspectives of achieving higher density recording and magnetization stability, the average particle size (for example, average major axis length) of ferromagnetic metal powder desirably ranges from 10 nm to 50 nm, preferably 20 nm to 50 nm. Reference can be made to Japanese Unexamined Patent Publication (KOKAI) No. 2011-216149, paragraphs 0137 to 0141, and Japanese Unexamined Patent Publication (KOKAI) No. 2005-251351, paragraphs 0009 to 0023, for details on ferromagnetic metal powder. The contents of the above publications are expressly incorporated herein by reference in their entirety.

The average particle size of various powders such as ferromagnetic powder is a value measured with a transmission electron microscope by the following method.

Powder is photographed at a magnification of 100,000-fold with a transmission electron microscope, and the photograph is printed on print paper at a total magnification of 500,000-fold to obtain a photograph of the particles constituting the powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the powder. A Model H-9000 transmission electron microscope made by Hitachi can be employed as the above transmission electron microscope, for example. The particle size can be measured with known image analysis software, such as KS-400 image analysis software from Carl Zeiss.

In the present invention and present specification, the average particle size of the powder, such as ferromagnetic powder and various kinds of powder is the average particle size as obtained by the above method unless specifically stated otherwise. The average particle size indicated in Examples further below was obtained using a Model H-9000 transmission electron microscope made by Hitachi and KS-400 image analysis software made by Carl Zeiss.

The method described in paragraph 0015 of Japanese Unexamined Patent Publication (KOKAI) No. 2011-048878, which is expressly incorporated herein by reference in its entirety, for example, can be employed as the method of collecting sample powder such as ferromagnetic powder from a magnetic layer for particle size measurement.

In the present invention and present specification, the size of the particles constituting powder (referred to as the "particle size", hereinafter) is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.

(2) When platelike or columnar (with the thickness or height being smaller than the maximum diameter of the plate surface or bottom surface) in shape, the particle size is denoted as the maximum diameter of the plate surface or bottom surface.

(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

Unless specifically stated otherwise, when the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

The content (fill rate) of ferromagnetic powder in the magnetic layer desirably falls within a range of 50 to 90 weight %, and preferably falls within a range of 60 to 90 weight %. A high fill rate is desirable from the perspective of increasing the recording density.

(Binder)

The magnetic layer of the above magnetic tape contains binder in addition to ferromagnetic powder and fatty acid ester. Binder is one or more resins. The binder employed can be in the form of polyurethane resin, polyester resin, polyamide resin, vinyl chloride resin, acrylic resin obtained by copolymerizing styrene, acrylonitrile, methyl methacrylate and the like, nitrocellulose and other cellulose resins, epoxy resin, phenoxy resin, polyvinyl acetal, polyvinyl butyral, and other polyvinyl alkyrals. These resins can be employed singly or two or more resins can be mixed for use. Of these, polyurethane resin, acrylic resin, cellulose resin and vinyl chloride resin are desirable. These resins can be homopolymer or copolymer. They can also be employed as binder in the nonmagnetic layer and backcoat layer described further below. Reference can be made to Japanese Unexamined Patent Publication (KOKAI) No. 2010-24113, paragraphs 0028 to 0031, with regard to the binder. The content of the above publication is expressly incorporated herein by reference in its entirety. The binder can also be radiation-curable resin such as electron beam-curable resin. Reference can be made to Japanese Unexamined Patent Publication (KOKAI) No. 2011-48878, paragraph 0044 and 0045, with regard to radiation-curable resin.

Curing agents can be employed along with the above resin that can be employed as the binder. Curing agents are compounds containing one or more crosslinkable functional groups per molecule. Polyisocyanates are suitable as curing agents. Reference can be made to Japanese Unexamined Patent Publication (KOKAI) No. 2011-216149, paragraphs 0124 and 0125, for details regarding polyisocyanates. The curing agent can be employed, for example, in a quantity of 0 to 80.0 weight parts, and desirably 50.0 to 80.0 weight parts from the perspective of enhancing the strength of the various layers such as the magnetic layer, per 100.0 weight parts of binder.

(Other Components)

Additives can be added as needed to the magnetic layer. The magnetic layer desirably contains one or more nonmagnetic fillers. Examples of nonmagnetic fillers are nonmagnetic fillers that are primarily added to control protrusions on the surface of the magnetic tape (also referred to as "protrusion-forming agents" hereinafter) and nonmagnetic fillers that are added as abrasives to impart abrasiveness to the surface of the magnetic tape. The magnetic layer desirably contains at least a protrusion-forming agent, and preferably contains a protrusion-forming agent and an abrasive.

Nonmagnetic fillers that are capable of functioning as protrusion-forming agents can be either organic or inorganic particles. Inorganic particles are desirable. Carbon black is also desirable. Carbon black with an average particle size (average primary particle size) of greater than or equal to 20 nm is desirable, and one with greater than or equal to 30 nm is preferred. The average particle size of carbon black is desirably less than or equal to 150 nm, preferably less than or equal to 100 nm.

Examples of inorganic particles are particles of metal oxides, metal carbonates, metal sulfates, metal nitrides, metal carbides, and metal sulfides. Specific examples are particles of α-alumina, β-alumina, γ-alumina, θ-alumina, silicon oxides such as silicon dioxide, silicon carbide, chromium oxide, cerium oxide, α-iron oxide, goethite, corundum, silicon nitride, titanium carbide, titanium, dioxide, tin oxide, magnesium carbonate, tungsten oxide, zirconium oxide, boron nitride, zinc oxide, calcium carbonate, calcium sulfate, barium sulfate, and molybdenum disulfide, as well as composite inorganic particles of two or more of the above. Inorganic oxide particles are preferred and silicon oxide particles are of greater preference.

From the perspective of further enhancing the electromagnetic characteristics, the nonmagnetic particles that are capable of functioning as protrusion-forming agents are desirably of highly uniform particle size. From the perspective of the availability of particles of highly uniform particle size, the nonmagnetic particles are desirably colloidal particles. When the nonmagnetic particles that are contained in the magnetic layer are colloidal particles, it suffices to evaluate whether the nonmagnetic particles have properties that meet the definition of colloidal particles that is set forth above if the nonmagnetic particles employed to form the magnetic layer is available. Alternatively, nonmagnetic particles removed from the magnetic layer can be evaluated to determine whether they have properties that satisfy the definition of colloidal particles set forth above. For example, the nonmagnetic particles can be removed from the magnetic layer by the following method.

1. Scraping off about 1 g of magnetic layer. The scraping can be done with a razor blade, for example.

2. Placing the magnetic layer sample that has been obtained by scraping in a container such as an eggplant-shaped flask and adding 100 mL of tetrahydrofuran to the container. Tetrahydrofuran comes in the form of commercial products to which a stabilizer has been added, and in the form of commercial products without stabilizer. A tetrahydrofuran to which no stabilizer has been added is used. The same is applied to the tetrahydrofuran that is employed for washing further below.

3. Mounting a reflux condenser on the container and heating the contents for 90 minutes in a bath at a water temperature of 60° C. Filtering with filter paper the contents of the container after heating, washing several times with tetrahydrofuran the solid component that has remained on the filter paper, and transferring the solid component to a container such as a beaker following washing. 4N (4 mol/L) hydrochloric acid aqueous solution is added to the container and non-dissolved residue is collected by filtration with a filter. A filter with a pore diameter smaller than 0.05 μm is employed. For example, a membrane filter (such as an MF Millipore made by Merck Corp.) that is employed in chromatographic analysis can be employed. Washing the residue that has been removed by filtration with a filter several times with pure water and then drying it.

Dissolving the ferromagnetic powder and organic material (binder and the like) obtained by the above operation and recovering the nonmagnetic particles as a residue.

Nonmagnetic particles can be extracted from the magnetic layer by the above process. When multiple types of nonmagnetic particles are contained in the nonmagnetic particles that are thus extracted, the multiple types of nonmagnetic particles are separated by differences in density.

Examples of desirable colloidal particles are inorganic oxide colloidal particles. The colloidal particles of the inorganic oxides set forth above are examples of inorganic oxide colloidal particles. Examples of composite inorganic oxide colloidal particles are $SiO_2 \cdot Al_2O_3$, $SiO_2 \cdot B_2O_3$, $TiO_2 \cdot CeO_2$, $SnO_2 \cdot Sb_2O_3$, $SiO_2 \cdot Al_2O_3 \cdot TiO_2$, and $TiO_2 \cdot CeO_2 \cdot SiO_2$. Desirable examples are inorganic oxide colloidal particles such as $SiO_2$, $Al_2O_3$, $TiO_2$, $ZrO_2$, and $Fe_2O_3$. Silica colloidal particles (colloidal silica) are preferred. Since the surface of common colloidal particles is hydrophilic, water is a suitable dispersion medium for fabricating a colloidal solution. For example, colloidal silica that has been obtained by a common synthesis method will have surfaces that are covered with polarized oxygen atoms ($O^{2-}$), and stabilization is achieved by forming hydroxyl groups by the adsorption of water in water. However, these particles tend not to be present in the form of a colloid in the organic solvents that are usually employed for the magnetic layer-forming composition. By contrast, the colloidal particles in the present invention and present specification refer to particles that are capable of dispersing without precipitating to yield a colloidal dispersion when 1 g is added to 100 mL of the organic solvent set forth above. These colloidal particles can be manufactured by known methods such as a surface treatment that renders the surface hydrophobic. The details of such a hydrophobic, rendering treatment are given in Japanese Unexamined Patent Publication (KOKAI) Heisei Nos. 5-269365 and 5-287213, and Japanese Unexamined Patent Publication (KOKAI) No. 2007-63117. The contents of the above publications are expressly incorporated herein by reference in their entirety.

Two types of manufacturing method are generally known for manufacturing desirable colloidal particles in the form of silica colloidal particles (colloidal silica): the water glass method and the sol-gel method. The water glass method refers to a method of subjecting a starting material in the form of sodium silicate (so-called water glass) to an ion exchange to generate active silicic acid, and then growing particles. The sol-gel method is a method of employing tetraalkoxysilane as a starting material and growing particles simultaneously with hydrolysis in the presence of a basic catalyst. When employ nonmagnetic particles as silica colloidal particles, the silica colloidal particles can be manufactured by either of these manufacturing methods.

As measured by the method set forth above, the average particle size of the nonmagnetic particles capable of functioning as a protrusion-forming agent desirably fails within a range of 50 nm to 200 nm, preferably within a range of 50 nm to 150 nm.

The content of the nonmagnetic particles capable of functioning as a protrusion-forming agent in the magnetic layer is desirably 1.0 to 4.0 weight parts, preferably 1.5 to 3.5 weight parts, per 100 weight parts of ferromagnetic powder.

Additionally, the nonmagnetic filler capable of functioning as an abrasive can be in the form of organic particles or inorganic particles. Inorganic particles are desirable. Examples of nonmagnetic particles capable of functioning as an abrasive are substances commonly employed as abrasives in the magnetic layer, such as particles of alumina ($Al_2O_3$), silicon carbide, boron carbide ($B_4C$), $SiO_2$, TiC, chromium oxide ($Cr_2O_3$), cerium oxide, zirconium oxide ($ZrO_2$), iron oxide, and diamond. Of these, particles of alumina such as $\alpha$-alumina and silicon carbide are desirable. The content of the nonmagnetic particles capable of functioning as an abrasive in the magnetic layer desirably falls within a range of 1.0 to 20.0 weight parts, preferably within a range of 3.0 to 15.0 weight parts, and more preferably, within a range 4.0 to 10.0 weight parts, per 100.0 weight parts of ferromagnetic powder. The average particle size of the nonmagnetic particles capable of functioning as an abrasive falls, for example, within a range of 30 nm to 300 nm, desirably within a range of 50 nm to 200 nm.

One or more additives from the group consisting of dispersing agents, dispersion adjuvants, fungicidal agents, antistatic agents, oxidation-inhibiting agents, and carbon black can be further incorporated in any quantity into the magnetic layer. The additives can be suitably selected for use from among commercial products based on the properties desired.

(Centerline Average Surface Roughness Ra)

A highly smooth surface of the magnetic tape on the magnetic layer side is desirable from the perspective of enhancing the electromagnetic characteristics. From this perspective, the centerline average surface roughness Ra as measured on the magnetic layer side surface of the magnetic tape is desirably less than or equal to 2.8 nm, preferably less than or equal to 2.5 nm, and more preferably, less than or equal to 2.0 nm. The centerline average surface roughness is, for example, greater than or equal to 1.2 nm or greater than or equal to 1.3 nm. However, from the perspective of enhancing the electromagnetic characteristics, the magnetic layer side surface of the magnetic tape is desirably highly smooth. Thus, the centerline average surface roughness Ra can fall below the range given by way of example above. The smoothness of the magnetic layer side surface of the magnetic tape can be controlled by known methods. For example, the smoothness of the magnetic layer side surface of the magnetic tape can vary with the size of the various particles contained in the magnetic layer (for example, the ferromagnetic powder and the nonmagnetic filler set forth above), the manufacturing conditions of the magnetic tape, and the like. Thus, the centerline average surface roughness Ra that is measured on the magnetic layer side surface of the magnetic tape can be controlled by adjusting these.

The magnetic layer set forth above is positioned either directly on the nonmagnetic support or on a nonmagnetic layer formed on the nonmagnetic support. Details of the nonmagnetic layer and the nonmagnetic support will be described further below.

<Nonmagnetic Layer>

The above magnetic tape can have a nonmagnetic layer containing nonmagnetic powder and binder between the nonmagnetic support and the magnetic layer. The nonmagnetic powder that is employed in the nonmagnetic layer can be an organic or an inorganic material. Carbon black or the like can also be employed. Examples of inorganic materials are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details. Reference can be made to Japanese Unexamined Patent Publication (KOKAI) No. 2010-24113, paragraphs 0040 and 0041, for details on carbon black that can be used in the nonmagnetic layer. The content (fill rate) of nonmagnetic powder in the nonmagnetic layer desirably falls within a range of 50 to 90 weight %, preferably within a range of 60 to 90 weight %.

For other details regarding binder, additives, and the like in the nonmagnetic layer, known techniques relating to nonmagnetic layers can be applied. As a further example, known techniques relating to magnetic layers can be applied with regard to the quantity and type of binders and the quantity and type of additives.

The nonmagnetic layer in the present invention may be in the form of an essentially nonmagnetic layer containing small quantities of ferromagnetic powder, either in the form of impurities or by intention, for example, along with nonmagnetic powder. In the present invention, the term "essentially nonmagnetic layer" refers to a layer with a residual magnetic flux density of less than or equal to 10 mT or a coercive force of less than or equal to 7.96 kA/m (100 Oe), or a layer with a residual magnetic flux density of less than or equal to 10 mT and a coercive force of less than or equal to 7.96 kA/m (100 Oe). The nonmagnetic layer desirably has neither residual magnetic flux density nor coercive force.

<Backcoat Layer>

In the above magnetic tape, a backcoat layer containing nonmagnetic powder and binder can be present on the opposite side of the nonmagnetic support from the side on which the magnetic layer is present. Carbon black and/or inorganic powder are desirably incorporated into the backcoat layer. Known techniques relating to the formulas of the magnetic layer and/or the nonmagnetic layer can be applied to the binder that is contained, and the various additives that can be optionally contained, in the backcoat layer.

<Nonmagnetic Support>

The nonmagnetic support will be described next. Known nonmagnetic supports in the form of biaxially stretched polyethylene terephthalate, polyethylene naphthalate, polyamide, polyamide-imide, aromatic polyamide, and the like are examples. Of these, polyethylene terephthalate, polyethylene naphthalate, and polyamide are desirable. These supports can be subjected in advance to treatments such as corona discharge, plasma treatments, adhesion-enhancing treatments, and heat treatments.

<Thickness of Nonmagnetic Support and Various Layers>

The thickness of the nonmagnetic support and various layers in the above magnetic tape are as follows. The thickness of the nonmagnetic support is, for example, 3.00 μm to 80.00 μm, desirably 3.00 μm to 50.00 μm, and preferably 3.00 μm to 10.0 μm.

From the perspective of high-density recording that is demanded in recent years, the thickness of the magnetic layer is desirably less than or equal to 100 nm. The thickness of the magnetic layer is preferably 10 nm to 100 nm, more preferably 20 nm to 90 nm. The magnetic layer can be comprised of a single layer, or the magnetic layer can be separated into two or more layers with different magnetic characteristics. Known multilayer magnetic layer structures can be applied.

The thickness of the nonmagnetic layer is, for example, 0.10 μm to 1.50 μm, desirably 0.10 μm to 1.00 μm.

The thickness of the backcoat layer is desirably less than or equal to 0.90 μm, preferably 0.10 μm to 0.70 μm.

The thickness of the various layers of the magnetic tape and of the nonmagnetic support can be determined by known film thickness-measuring methods. For example, a cross-section in the direction of thickness of the magnetic tape is exposed by a known method such as an ion beam or a microtome, after which the exposed cross-section is observed with a scanning electron microscope. Various thicknesses, such as the thickness determined in one spot in the direction of thickness while observing the cross-section, or the arithmetic average of the thickness determined in two or more randomly extracted spots—for example, two spots—can be determined. Alternatively, the thickness of each layer can be determined as a design thickness calculated from the manufacturing conditions.

<Manufacturing Method>

(Preparation of Various Layer-Forming Compositions)

The composition for forming the magnetic layer or any of the optionally provided layers such as the nonmagnetic layer and the backcoat layer will normally contain solvent in addition to the various components set forth above. Examples of the solvent are the various organic solvents that are commonly employed in the manufacturing of particulate magnetic recording media. As specific examples, ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methyl cyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethyl formamide, hexane and cyclohexane can be employed in any ratio.

The process of preparing the compositions for forming the various layers, such as the magnetic layer, as well as the nonmagnetic layer and the backcoat layer that are optionally provided, normally includes at least a kneading step, a dispersion step, and mixing steps provided before and after these steps as needed. Each of these steps can be divided into two or more stages. All of the starting materials in the form of ferromagnetic powder, binder, fatty acid ester, various additives, solvent and the like that are employed in the present invention can be added at the start, or part way through, any of these steps. An individual starting material can be divided for addition in two or more steps. For example, binder can be divided up and added in the kneading step, dispersing step, and in a kneading step after the dispersing step for viscosity adjustment. To manufacture the magnetic tape, conventionally known manufacturing techniques can be employed. An open kneader, continuous kneader, pressurized kneader, extruder, or some other device with powerful kneading force is desirably employed in the kneading step. Details regarding these kneading processes are given in Japanese Unexamined Patent Publication (KOKAI) Heisei Nos. 1-106338 and 1-79274, which are expressly incorporated herein by reference in their entirety. Glass beads or some other form of bead can be employed to disperse the compositions for forming the various layers. High-density dispersion beads in the form of zirconia beads, titania beads, and steel beads are suitable as such dispersion beads. The particle diameter and fill rate of these dispersion beads can be optimized for use. A known disperser can be employed.

(Coating Step)

The magnetic layer can be formed by coating the magnetic layer-forming composition directly on the nonmagnetic support, or by sequentially or simultaneously multilayer coating the magnetic layer-forming composition and the nonmagnetic layer-forming composition. The backcoat layer can be formed by coating the backcoat layer on the opposite side of the nonmagnetic support from the side on which the magnetic layer is present (or on the side on which a magnetic layer is provided later). For details regarding the coatings to form the various layers, reference can be made to paragraph 0066 of Japanese Unexamined Patent Publication (KOKAI) No. 2010-231843, which is expressly incorporated herein by reference in its entirety.

(Other Steps)

For various other steps in manufacturing the magnetic tape, reference can be made to paragraphs 0067 to 0070 of Japanese Unexamined Patent Publication (KOKAI) No. 2010-231843.

(One Desirable Embodiment of the Manufacturing Method)

A desirable example of the manufacturing method is one in which vibration is applied to the magnetic layer to enhance uniformity of the thickness of the liquid film of fatty acid ester on the surface of the magnetic tape. The present inventors presume that applying vibration can cause the liquid film of fatty acid ester on the surface of the magnetic tape to flow, enhancing the uniformity of the thickness of the liquid film.

That is, an aspect of the present invention relates to a method of manufacturing the above magnetic tape, including:

coating and drying a magnetic layer-forming composition containing ferromagnetic powder, binder, and a fatty acid ester on a nonmagnetic support to form a magnetic layer; and applying vibration to the magnetic layer that has been formed.

With the exception of applying vibration to the magnetic layer, the manufacturing process is identical to the usual magnetic tape manufacturing process. The details are as set forth above.

The means of applying vibration is not specifically limited. For example, vibration can be applied to the magnetic layer by bringing the surface (on which a backcoat layer can be formed) on the opposite side of the nonmagnetic support from the side on which the magnetic layer has been formed into contact with a vibration-imparting unit. Running can be conducted while bringing the nonmagnetic support on which the magnetic layer has been formed into contact with the vibration-imparting unit. The vibration-imparting unit can apply vibration to an object brought into contact with the unit, for example, by being equipped with internal ultrasonic vibrators. The vibration that is applied to the magnetic layer can be adjusted by means of the vibration frequency and intensity of the ultrasonic vibrators, and the contact period with the vibration-imparting unit. For example, the contact period can be adjusted based on the running speed during contact of the nonmagnetic support, on which the magnetic layer has been formed with, the vibration-imparting unit. These vibration-imparting conditions are not specifically limited. It suffices to set them in a manner permitting control of the spacing distribution, in particular, the spacing distribution before vacuum heating $FWHM_{before}$. It is also possible to optimize the conditions by conducting preliminary tests prior to actual manufacturing in order to set the vibration-imparting conditions.

The spacing distribution after vacuum heating, $FWHM_{after}$, tends to be decreased by intensifying the dispersion conditions of the magnetic layer-forming composition (for example, by increasing the number of times dispersion is conducted or by extending the dispersion period) or by intensifying the filtration conditions (for example, by employing a filter with a small pore diameter as the filter used in filtration or by increasing the number of times filtration is conducted with a filter). The present inventors presume this to be because the uniformity of the protrusions that are present on the surface of the magnetic tape can be enhanced by enhancing dispersion of the particulate material contained in the magnetic layer-forming composition, particularly of the nonmagnetic particles that are capable of functioning as a protrusion-forming agent set forth above, and by enhancing the uniformity of the particle size. The dispersion conditions and the filtration conditions can also be optimized by conducting preliminary testing prior to actual manufacturing.

In a magnetic tape having a magnetic layer containing nonmagnetic filler in the form of carbon black, the use of a dispersing agent as a magnetic layer component to enhance dispersion of the carbon black can be an effective way to reduce the spacing distribution after vacuum heating $FWHM_{after}$. Examples of dispersing agents for carbon black are organic tertiary amines. Reference can be made to Japanese Unexamined Patent Publication (KOKAI) No. 2013-049832, paragraphs 0011 to 0018 and 0021 with regard to organic tertiary amines. The content of the above publication is expressly incorporated herein by reference in its entirety. The organic tertiary amine is preferably trialkylamine. The alkyl groups that are present in the trialkylamine desirably have 1 to 18 carbon atoms. The three alkyl groups that are present in the trialkylamine can be identical or different. Reference can be made to Japanese Unexamined Patent Publication (KOKAI) No. 2013-049832, paragraphs 0015 and 0016, for details about the alkyl groups. Trialkylamine in the form of trioctylamine is particularly desirable.

A desirable embodiment of the manufacturing method has been set forth above. However, the magnetic tape according to an aspect of the present invention is not limited to being manufactured by the above manufacturing method.

The magnetic tape according to an aspect of the present invention that has been set forth above can afford good electromagnetic characteristics and can inhibit scratching and sticking of the surface of the magnetic tape and the head during running, thereby permitting highly reliable use for an extended period.

EXAMPLES

The present invention will be described based on Examples below. However, the present invention is not intended to be limited by the embodiments described in Examples. The "parts" indicated below denotes "weight parts".

Example 3

<Magnetic Layer-Forming Composition>

| (Magnetic liquid) | |
|---|---|
| Ferromagnetic hexagonal barium ferrite powder (coercive force Hc: 2,100 Oe (168 kA/m), average particle size: 25 nm) | 100.0 parts |
| Sulfonic acid group-containing polyurethane resin: | 15.0 parts |
| Cyclohexanone: | 150.0 parts |
| Methyl ethyl ketone: | 150.0 parts |
| (Abrasive liquid) | |
| α-Alumina (average particle size: 110 nm): | 9.0 parts |
| Vinyl chloride copolymer (MR 110 made by Zeon Corp.): | 0.7 part |
| Cyclohexanone: | 20 parts |
| (Silica sol) | |
| Colloidal silica (average particle size: see Table 1) prepared by the sol-gel method: | 3.5 parts |
| Methyl ethyl ketone: | 8.2 parts |
| (Other components) | |
| Butyl stearate: | 1.0 part |
| Stearic acid: | 1.0 part |
| Polyisocyanate (Coronate made by Nippon Polyurethane Industry Co., Ltd.): | 2.5 parts |
| (Solvents added to finish) | |
| Cyclohexanone: | 180.0 parts |
| Methyl ethyl ketone: | 180.0 parts |

<Nonmagnetic Layer-Forming Composition>

| | |
|---|---|
| Nonmagnetic inorganic powder (α-iron oxide): (average particle size: 0.15 µm average acicular ratio: 7 Brunauer-Emmett-Teller (BET) specific surface area: 52 m²/g) | 80.0 parts |
| Carbon black (average particle size: 20 nm): | 20.0 parts |
| Electron beam-curable vinyl chloride copolymer: | 13.0 parts |
| Electron beam-curable polyurethane resin: | 6.0 parts |
| Phenylphosphonic acid: | 3.0 parts |
| Cyclohexanone: | 140.0 parts |
| Methyl ethyl ketone: | 170.0 parts |
| Butyl stearate: | See Table 1 |
| Stearic acid: | See Table 1 |

<Backcoat Layer-Forming Composition>

| | |
|---|---|
| Nonmagnetic inorganic powder (α-iron oxide): (average particle size: 0.15 μm average acicular ratio: 7 BET specific surface area: 52 m²/g) | 80.0 parts |
| Carbon black (average particle size: 20 nm): | 20.0 parts |
| Carbon black (average particle size: 100 nm): | 3.0 parts |
| Vinyl chloride copolymer: | 13.0 parts |
| Sulfonic acid group-containing polyurethane resin: | 6.0 parts |
| Phenylphosphonic acid: | 3.0 parts |
| Cyclohexanone: | 140.0 parts |
| Methyl ethyl ketone: | 170.0 parts |
| Stearic acid: | 3.0 parts |
| Polyisocyanate (Coronate made by Nippon Polyurethane Industry Co., Ltd.): | 5.0 parts |
| Methyl ethyl ketone: | 400.0 parts |

<Preparation of Various Layer-Forming Compositions>

The magnetic layer-forming composition was prepared by the following method.

The above magnetic liquid was kneaded and diluted in an open kneader. It was then subjected to 12 passes of dispersion processing, each pass consisting of a retention time of 2 minutes at a rotor peripheral tip speed of 10 m/sec. and a bead fill rate of 80 volume % using zirconia ($ArO_2$) beads 0.5 mm in particle diameter (referred to as "Zr beads" hereinafter) in a horizontal bead mill disperser.

With the abrasive liquid, the above components were mixed and then added along with Zr beads 1 mm in particle diameter to a vertical sand mill disperser. The mixture was adjusted to a bead volume/(abrasive liquid volume+bead volume) of 60% and dispersion processing was conducted in the sand mill for 180 minutes. The processed liquid was removed. A flow-type ultrasonic dispersion and filtration device was employed to conduct ultrasonic dispersion and filtration processing.

The magnetic liquid, silica sol, and abrasive liquid, along with the other components and solvents added to finish were charged to a dissolver-stirrer and stirred for 30 minutes at a peripheral speed of 10 m/sec. The mixture was processed in a flow-type ultrasonic disperser at a flow rate of 7.5 kg/minute for the number of passes indicated in Table 1 and then filtered for the number of times indicated in Table 1 through a filter the pore diameter of which is given in Table 1 to prepare a magnetic layer-forming composition.

The nonmagnetic layer-forming composition was prepared by the following method.

The above components excluding the lubricants (butyl stearate and stearic acid) were kneaded and diluted in an open kneader. Subsequently, dispersion processing was conducted in a horizontal bead mill disperser. Subsequently, the lubricants (butyl stearate, stearic acid) were added and the mixture was stirred and mixed in a dissolver-stirrer to prepare a nonmagnetic layer-forming composition.

The backcoat layer-forming composition was prepared by the following method.

The above components excluding the lubricant (stearic acid), polyisocyanate, and methyl ethyl ketone (400.0 parts) were kneaded and diluted in an open kneader. Subsequently, the mixture was dispersion processed in a horizontal bead mill disperser. Subsequently, the lubricant (stearic acid), polyisocyanate, and methyl ethyl ketone (400.0 parts) were added and the mixture was stirred and mixed in a dissolver-stirrer to prepare a backcoat layer-forming composition.

<Fabrication of Magnetic Tape>

The nonmagnetic layer-forming composition was coated and dried to a thickness of 1.00 μm on a polyethylene naphthalate support 6.00 μm in thickness and then irradiated with an electron beam at a 125 kV acceleration voltage to an energy of 40 kGy. The magnetic layer-forming composition was then coated and dried thereover to a thickness of 50 nm. The backcoat layer-forming composition was then coated and dried to a thickness of 0.50 μm on the opposite surface of the support.

Subsequently, calender rolls contained solely of metal rolls were employed to conduct a surface-smoothing treatment (calender processing) at a calender processing speed of 80 m/min, a linear pressure of 300 kg/cm (294 kN/m), and at the calender roll surface temperature indicated in Table 1. Subsequently, a heat treatment was conducted for 36 hours in an environment of an atmospheric temperature of 70° C., Following the heat treatment, the product was slit to ½ inch (0.0127 meter) width. Following slitting, the surface of the magnetic layer was cleaned with a tape cleaning device with a tape feeding out and winding device, in which a razor blade and a nonwoven cloth had been mounted so as to press against the magnetic layer surface, yielding a tape sample.

The tape sample obtained was positioned on the vibration-imparting device shown in FIG. 1 so that the backcoat layer side surface was in contact with the vibration-imparting unit and the tape sample (numeral 101 in FIG. 1) was conveyed at a speed of 0.5 m/sec. to impart vibration to the magnetic layer of the tape sample. In FIG. 1, numeral 102 denotes a guide roller (one of two guide rollers has been labeled with the numeral 102) and numeral 103 denotes a vibration-imparting device (a vibration-imparting unit containing within it an ultrasonic vibrator). The arrow indicates the direction of conveyance. The vibration-imparting time, consisting of the time from the start of contact between a given spot on the tape sample with the vibration-imparting unit to the end of contact, is given in Table 1. Vibration was imparted at the vibration frequency of the ultrasonic vibrator and at the intensity indicated in Table 1.

A magnetic tape was fabricated as set forth above.

Examples 1, 2, 4, to 9, and Comparative Examples 1 to 15

With the exception that the formulas of the various layer-forming compositions and/or manufacturing conditions were changed as indicated in Table 1, magnetic tapes were fabricated by the same method as in Example 3. The vibrating-imparting time was adjusted by varying the conveyance speed of the tape sample.

In Table 1, CS indicates colloidal silica prepared by the sol-gel method. The colloidal silica that was employed in Examples and Comparative Examples was confirmed to be colloidal particles meeting the definition set forth above.

In Table 1, CB denotes carbon black having the average particle size (average primary particle size) indicated in Table 1. In Examples and Comparative Examples in which carbon black was employed as nonmagnetic filler in the magnetic layer, a carbon black liquid prepared by the method set forth below was employed instead of the silica sol in a quantity such that the content of carbon black in the magnetic layer-forming composition was 3.5 weight parts, and a magnetic layer-forming composition was prepared.

The carbon black liquid was prepared by mixing 0.50 part of the carbon black indicated in Table 1, 0.05 part of trioctylamine (Firmin (Japanese trademark) T08 made by Kao), and 4.50 parts of cyclohexane and processing the mixture as follows. The mixture was ultrasonically treated for 6 hours at a stirring speed of 1,500 rpm in a batch-type ultrasonic dispersion device equipped with stirrer. The liquefied carbon black liquid was subjected to six passes of dispersion processing, each pass containing a retention time of 2 minutes, at a rotor tip peripheral speed of 10 m/sec. and a bead fill rate of 80 volume % using Zr beads 0.5 mm in particle diameter in a horizontal bead mill disperser, and then subjected to three passes of processing at a flow rate of 3 kg/min in a flow-type ultrasonic disperser.

Example 10

<Preparation of Various Layer-Forming Compositions>

A magnetic layer-forming composition, nonmagnetic layer-forming composition, and backcoat layer-forming composition were prepared in the same manner as in Example 1.

<Fabrication of Magnetic Tape>

The nonmagnetic layer-forming composition was coated and dried to a thickness of 1.00 µm on a polyethylene naphthalate support 6.00 µm in thickness and then irradiated with an electron beam to an energy of 40 kGy at an acceleration voltage of 125 kV. The magnetic layer-coating composition was coated and dried thereover to a thickness of 50 nm to form a magnetic layer.

Subsequently, the tape sample on which the nonmagnetic layer and magnetic layer had been formed on the support as set forth above was placed in the vibration-imparting device shown in FIG. 1 so that the surface on the opposite side from the surface on which the nonmagnetic layer and magnetic layer had been formed was in contact with the vibration-imparting unit. The tape sample was conveyed at a conveyance speed of 0.5 m/sec. to impart vibration to the magnetic layer. The vibration-imparting time, consisting of the time from the start of contact between a given spot on the tape sample with the vibration-imparting unit to the end of contact, is given in Table 1. Vibration was imparted at the vibration frequency of the ultrasonic vibrator and at the intensity indicated in Table 1.

Subsequently, the backcoat layer-forming composition was coated and dried to a thickness of 0.50 µm on the surface on the opposite side of the tape sample from the surface on which the nonmagnetic layer and magnetic layer had been formed.

Subsequently, calender rolls contained solely of metal rolls were employed to conduct a surface-smoothing treatment (calender processing) at a calender processing speed of 80 m/min, a linear pressure of 300 kg/cm (294 kN/m), and at the calender roll surface temperature indicated in Table 1. Subsequently, a heat treatment was conducted for 36 hours in an environment of an atmospheric temperature of 70° C. Following the heat treatment, the product was slit to ½ inch (0.0127 meter) width. Following slitting, the surface of the magnetic layer was cleaned with a tape cleaning device with a tape feeding out and winding device, in which a razor blade and a nonwoven cloth had been mounted so as to press against the magnetic layer surface, yielding a magnetic tape.

Examples 11 to 14

With the exception that the manufacturing conditions and/or the formulas of the various layer-forming compositions given in Table 1 were changed, magnetic tapes were fabricated in the same manner as in Example 10. The vibration-imparting time was adjusted by varying the conveyance speed of the tape sample.

In Table 1, BF denotes ferromagnetic hexagonal ferrite powder. The ferromagnetic hexagonal ferrite powder employed in the various Examples and Comparative Examples was identical to the ferromagnetic hexagonal ferrite powder employed in Example 3.

In Table 1, MP denotes ferromagnetic metal powder with an average particle size (average major axis length) of 30 nm.

Methods of Evaluating the Physical Properties of the Magnetic Tape

<1. Spacing Distribution before and after Vacuum Heating $FWHM_{before}$ and $FWHM_{after}$>

The spacing distribution before and after vacuum heating $FWHM_{before}$ and $FWHM_{after}$ were determined by the following method using a tape spacing analyzer (TSA) (made by Micro Physics Corp.).

A glass sheet provided on the TSA was disposed on the magnetic layer side surface of the magnetic tape. In this state, a half-sphere made of urethane and provided on the TSA was employed as a pressing member. This half-sphere was pressed with a pressure of $5.05 \times 10^4$ N/m (0.5 atm) against the backcoat layer side surface of the magnetic tape. In this state, white light from a stroboscope provided on the TSA was irradiated through the glass sheet onto a certain area (150,000 µm² to 200,000 µm²) of the magnetic layer side surface of the magnetic tape. The reflected light obtained was passed through an interference filter (a filter selectively passing light with a wavelength of 633 nm) and received by a charge-coupled device (CCD) to obtain an interference fringe image produced by protrusions and indentation within this area.

The image was divided into 300,000 points and the distance (spacing) from the surface of the glass sheet on the magnetic tape side to the magnetic layer side surface of the magnetic tape was determined for each point. These values were plotted as a histogram, the histogram was fit to a Gaussian distribution, and the full width at half maximum obtained was adopted as the full width at half maximum of the spacing distribution.

Vacuum heating was conducted by storing the magnetic tape for 24 hours in a constant temperature vacuum drier with an internal atmospheric temperature of 70° C. to 90° C. and a degree of vacuum of greater than or equal to 200 Pa and less than or equal to 0.01 MPa.

<2. Difference, $S_{after} - S_{before}$>

The most frequent value of the histogram before vacuum heating was subtracted from the most frequent value of the histogram after vacuum heating obtained in 1. above to obtain the difference $S_{after} - S_{before}$.

<3. Centerline Average Surface Roughness Ra of the Magnetic Tape>

A 40 µm×40 µm area of the magnetic layer side surface of the magnetic tape was measured with an AFM (Nanoscope 4 made by Veeco) and the centerline average surface roughness Ra was determined. The scan rate (displacement rate of the probe) was 40 µm/sec. and the resolution was 512 pixels×512 pixels.

Method of Evaluating Magnetic Tape Performance

<1. Evaluation of the Electromagnetic Characteristics (Signal-to-Noise Ratio: SNR)>

A recording head (metal-in-gap (MIG) head, gap length 0.15 µm, 1.8 T) and a reproduction-use giant magnetoresistive (GMR) head (reproduction track width: 1 µm) were mounted on a loop tester, a 325 kfci signal was recorded, after which the reproduction output and the SNR were measured in an environment with an atmospheric temperature of 23° C.±1° C. and a relatively humidity of 50% for the magnetic tapes fabricated as set forth above. Adopting the SNR of Comparative Example 1 as 0 dB, an SNR of greater than or equal to 0 dB was evaluated as a magnetic tape suitable for high-density recording and a level of greater than or equal to 1.0 dB was evaluated as performance capable of responding to the stringent needs of the future in terms of higher density recording.

<2. Evaluation of Scratching of the Surface of the Magnetic Tape>

The phenomenon of reduced reproduction signal amplitude is found in localized spots where scratches have been generated when scratching of the surface of the magnetic tape occurs during running. Accordingly, scratching of the surface of the magnetic tape during running was evaluated based on the frequency of the decrease in reproduction signal amplitude by the following method.

A magnetic recording and reproduction head removed from, a Linear Tape-Open Generation 6 (LTO (Japanese trademark) drive made by IBM was mounted on a tape running system. While applying 0.6 N of tension, a magnetic tape 20 m in length was fed out through feed rolls and run at a speed of 12 m/sec., and wound up on winding rolls, and the tape was subjected to 10,000 cycles of this method in an environment of an atmospheric temperature of 40° C.±1° C. and relative humidity of 80%. The recording and reproduction signal outputs were picked up with an external analog/digital (AD) converter, and the frequency with which the reproduction signal amplitude dropped by 70% or more of the average (average measurement value over the entire length) was tallied. When this frequency was 10 times/m or less for a unit length of tape, an evaluation was made that the performance met the stringent, needs of the future in terms of higher density recording.

<3. Evaluation of Sticking During Running>

A strain gage was mounted on the head of 2. above. The voltage level obtained during running under the conditions of 2. above was monitored. When the load calculated from the voltage level exceeded 1.5 N, a determination of sticking was made. When the number of times sticking occurred was less than or equal to 1 for 10,000 nm cycles, an evaluation was made that the performance met the stringent needs of the future in terms of higher density recording.

The results of the above are given in Table 1.

TABLE 1

| | Ex.1 | Ex.2 | Ex.3 | Ex.4 | Ex.5 | Ex.6 | Ex.7 | Ex.8 | Ex.9 |
|---|---|---|---|---|---|---|---|---|---|
| Ferromagnetic powder | BF | MP | BF | BF | BF | BF | BF | BF | BF |
| Type of nonmagnetic filler | CB | CB | CS | CS | CS | CS | CS | CB | CS |
| Average particle size of nonmagnetic filler | 90 nm | 90 nm | 120 nm | 120 nm | 120 nm | 120 nm | 120 nm | 90 nm | 120 nm |
| Calendar roll surface temperature | 110° C. | 110° C. | 110° C. | 110° C. | 110° C. | 110° C. | 110° C. | 80° C. | 110° C. |
| Content of butyl stearate in the nonmagnetic layer-forming composition | 2.0 parts | 2.0 parts | 2.0 parts | 8.0 parts | 2.0 parts | 2.0 parts | 2.0 parts | 2.0 parts | 0.2 parts |
| Content of stearic acid in the nonmagnetic layer-forming composition | 1.0 part | 1.0 part | 1.0 part | 1.0 part | 1.0 part | 1.0 part | 1.0 part | 1.0 part | 1.0 part |
| Vibration imparting condition | Vibration-imparting time: 0.8 sec. Vibration frequency: 30 kHz Intensity: 100 W | Vibration-imparting time: 0.8 sec. Vibration frequency: 30 kHz Intensity: 100 W | Vibration-imparting time: 0.8 sec. Vibration frequency: 30 kHz Intensity: 100 W | Vibration-imparting time: 0.8 sec. Vibration frequency: 30 kHz Intensity: 100 W | Vibration-imparting time: 2.0 sec. Vibration frequency: 30 kHz Intensity: 100 W | Vibration-imparting time: 0.8 sec. Vibration frequency: 30 kHz Intensity: 100 W | Vibration-imparting time: 2.0 sec. Vibration frequency: 30 kHz Intensity: 100 W | Vibration-imparting time: 2.0 sec. Vibration frequency: 30 kHz Intensity: 100 W | Vibration-imparting time: 0.8 sec. Vibration frequency: 30 kHz Intensity: 100 W |
| The number of passes in the flow-type ultrasonic disperser | 20 | 20 | 20 | 20 | 20 | 30 | 30 | 30 | 20 |
| The number of times filtration is conducted | 5 | 5 | 5 | 5 | 5 | 10 | 10 | 10 | 5 |
| Pore diameter of filter | 0.5 μm | 0.5 μm | 0.5 μm | 0.5 μm | 0.5 μm | 0.3 μm | 0.3 μm | 0.3 μm | 0.5 μm |
| Centerline average surface roughness Ra | 1.8 nm | 1.8 nm | 1.6 nm | 1.6 nm | 1.6 nm | 1.5 nm | 1.5 nm | 2.7 nm | 1.6 nm |
| Spacing distribution before vacuum heating FWHMbefore | 4.5 nm | 4.5 nm | 4.3 nm | 4.3 nm | 1.0 nm | 4.3 nm | 1.0 nm | 1.0 nm | 4.3 nm |
| Spacing distribution after vacuum heating FWHMafter | 4.5 nm | 4.5 nm | 4.3 nm | 4.3 nm | 4.3 nm | 1.0 nm | 1.0 nm | 1.0 nm | 4.3 nm |
| Difference, Safter-Sbefore | 3.0 nm | 3.0 nm | 3.0 nm | 8.0 nm | 3.0 nm | 3.0 nm | 3.0 nm | 2.0 nm | 0.2 nm |
| SNR | 2.0 dB | 2.0 dB | 2.2 dB | 2.2 dB | 2.5 dB | 2.5 dB | 2.5 dB | 0 dB | 2.2 dB |
| Evaluation of sticking during running (times) | 1 | 1 | 1 | 1 | 1 | 0 | 0 | 0 | 1 |
| Evaluation of scratching of the surface of the magnetic tape (times/m) | 8 | 9 | 6 | 5 | 1 | 5 | 0 | 0 | 8 |

| | Ex.10 | Ex.11 | Ex.12 | Ex.13 | Ex.14 |
|---|---|---|---|---|---|
| Ferromagnetic powder | BF | BF | BF | BF | BF |
| Type of nonmagnetic filler | CB | CS | CS | CS | CS |
| Average particle size of nonmagnetic filler | 90 nm | 120 nm | 120 nm | 120 nm | 120 nm |
| Calendar roll surface temperature | 110° C. | 110° C. | 110° C. | 110° C. | 110° C. |

TABLE 1-continued

|  |  |  |  |  |  |
|---|---|---|---|---|---|
| Content of butyl stearate in the nonmagnetic layer-forming composition | 2.0 parts | 2.0 parts | 8.0 parts | 2.0 parts | 0.2 parts |
| Content of stearic acid in the nonmagnetic layer-forming composition | 1.0 part | 1.0 part | 1.0 part | 1.0 part | 1.0 part |
| Vibration imparting condition | Vibration-imparting time: 0.8 sec. Vibration frequency: 30 kHz Intensity: 100 W | Vibration-imparting time: 0.8 sec. Vibration frequency: 30 kHz Intensity: 100 W | Vibration-imparting time: 0.8 sec. Vibration frequency: 30 kHz Intensity: 100 W | Vibration-imparting time: 2.0 sec. Vibration frequency: 30 kHz Intensity: 100 W | Vibration-imparting time: 0.8 sec. Vibration frequency: 30 kHz Intensity: 100 W |
| The number of passes in the flow-type ultrasonic disperser | 20 | 20 | 20 | 30 | 20 |
| The number of times filtration is conducted | 5 | 5 | 5 | 10 | 5 |
| Pore diameter of filter | 0.5 μm | 0.5 μm | 0.5 μm | 0.3 μm | 0.5 μm |
| Centerline average surface roughness Ra | 1.8 nm | 1.6 nm | 1.6 nm | 1.5 nm | 1.6 nm |
| Spacing distribution before vacuum heating FWHMbefore | 4.6 nm | 4.4 nm | 4.3 nm | 1.1 nm | 4.4 nm |
| Spacing distribution after vacuum heating FWHMafter | 4.5 nm | 4.3 nm | 4.3 nm | 1.0 nm | 4.3 nm |
| Difference, Safter-Sbefore | 2.9 nm | 3.1 nm | 8.0 nm | 2.9 nm | 0.2 nm |
| SNR | 2.1 dB | 2.3 dB | 2.2 dB | 2.6 dB | 2.3 dB |
| Evaluation of sticking during running (times) | 1 | 0 | 1 | 0 | 1 |
| Evaluation of scratching of the surface of the magnetic tape (times/m) | 9 | 7 | 5 | 1 | 7 |

|  | Comp. Ex.1 | Comp. Ex.2 | Comp. Ex.3 | Comp. Ex.4 | Comp. Ex.5 | Comp. Ex.6 | Comp. Ex.7 | Comp. Ex.8 | Comp. Ex.9 |
|---|---|---|---|---|---|---|---|---|---|
| Ferromagnetic powder | BF | BF | BF | BF | BF | BF | BF | BF | BF |
| Type of nonmagnetic filler | CB | CB | CS | CS | CS | CS | CS | CS | CS |
| Average particle size of nonmagnetic filler | 90 nm | 90 nm | 120 nm | 120 nm | 120 nm | 120 nm | 120 nm | 120 nm | 120 nm |
| Calendar roll surface temperature | 80° C. | 90° C. | 80° C. | 110° C. | 110° C. | 110° C. | 110° C. | 110° C. | 110° C. |
| Content of butyl stearate in the nonmagnetic layer-forming composition | 2.0 parts | 2.0 parts | 2.0 parts | 2.0 parts | 8.0 parts | 2.0 parts | 2.0 parts | 2.0 parts | 2.0 parts |
| Content of stearic acid in the nonmagnetic layer-forming composition | 1.0 part | 1.0 part | 1.0 part | 1.0 part | 1.0 part | 1.0 part | 1.0 part | 1.0 part | 1.0 part |
| Vibration imparting condition | Not conducted | Not conducted | Not conducted | Not conducted | Not conducted | Vibration-imparting time: 0.5 sec. Vibration frequency 20 kHz Intensity: 100 W | Vibration-imparting time: 0.8 sec. Vibration frequency 30 kHz Intensity: 100 W | Vibration-imparting time: 2.0 sec. Vibration frequency 30 kHz Intensity: 100 W | Vibration-imparting time: 2.0 sec. Vibration frequency 90 kHz Intensity: 100 W |
| The number of passes in the flow-type ultrasonic disperser | 3 | 3 | 3 | 3 | 3 | 3 | 3 | 3 | 3 |
| The number of times filtration is conducted | 1 | 1 | 1 | 1 | 1 | 1 | 1 | 1 | 1 |
| Pore diameter of filter | 1.0 μm | 1.0 μm | 1.0 μm | 1.0 μm | 1.0 μm | 1.0 μm | 1.0 μm | 1.0 μm | 1.0 μm |
| Centerline average surface roughness Ra | 2.7 nm | 2.3 nm | 2.2 nm | 1.8 nm | 1.8 nm | 1.8 nm | 1.8 nm | 1.8 nm | 1.8 nm |
| Spacing distribution before vacuum heating FWHMbefore | 6.0 nm | 6.0 nm | 5.5 nm | 5.5 nm | 5.5 nm | 5.2 nm | 4.5 nm | 1.0 nm | 5.5 nm |
| Spacing distribution after vacuum heating FWHMafter | 6.0 nm | 6.0 nm | 5.5 nm | 5.5 nm | 5.5 nm | 5.5 nm | 5.5 nm | 5.5 nm | 5.5 nm |
| Difference, Safter-Sbefore | 3.0 nm | 3.0 nm | 3.0 nm | 3.0 nm | 8.0 nm | 3.0 nm | 3.0 nm | 3.0 nm | 3.0 nm |
| SNR | 0 dB | 0.3 dB | 0.4 dB | 2.0 dB | 2.0 dB | 2.0 dB | 2.0 dB | 2.0 dB | 2.0 dB |
| Evaluation of sticking during running (times) | 5 | 9 | 6 | 12 | 30 | 5 | 5 | 4 | 22 |
| Evaluation of scratching of the surface of the magnetic tape (times/m) | 20 | 30 | 18 | 28 | 17 | 12 | 8 | 1 | 27 |

TABLE 1-continued

|  | Comp.Ex.10 | Comp.Ex.11 | Comp.Ex.12 | Comp.Ex.13 | Comp.Ex.14 | Comp.Ex.15 |
| --- | --- | --- | --- | --- | --- | --- |
| Ferromagnetic powder | BF | BF | BF | BF | BF | BF |
| Type of nonmagnetic filler | CS | CS | CS | CS | CS | CS |
| Average particle size of nonmagnetic filler | 120 nm | 120 nm | 120 nm | 120 nm | 120 nm | 120 nm |
| Calendar roll surface temperature | 110° C. | 110° C. | 110° C. | 110° C. | 110° C. | 110° C. |
| Content of butyl stearate in the nonmagnetic layer-forming composition | 2.0 parts | 2.0 parts | 2.0 parts | 0 part | 16.0 parts | 2.0 parts |
| Content of stearic acid in the nonmagnetic layer-forming composition | 1.0 part | 1.0 part | 1.0 part | 1.0 part | 1.0 part | 2.0 parts |
| Vibration imparting condition | Not conducted | Not conducted | Not conducted | Vibration-imparting time: 0.8 sec. Vibration frequency: 30 kHz Intensity: 100 W | Vibration-imparting time: 0.8 sec. Vibration frequency: 30 kHz Intensity: 100 W | Not conducted |
| The number of passes in the flow-type ultrasonic disperser | 20 | 30 | 50 | 20 | 20 | 3 |
| The number of times filtration is conducted | 5 | 10 | 15 | 5 | 5 | 1 |
| Pore diameter of filter | 0.5 μm | 0.3 μm | 0.3 μm | 0.5 μm | 0.5 μm | 1.0 μm |
| Centerline average surface roughness Ra | 1.6 nm | 1.5 nm | 2.2 nm | 1.6 nm | 1.6 nm | 1.8 nm |
| Spacing distribution before vacuum heating FWHMbefore | 5.3 nm | 5.2 nm | 6.0 nm | 4.3 nm | 4.3 nm | 5.5 nm |
| Spacing distribution after vacuum heating FWHMafter | 4.5 nm | 1.0 nm | 5.5 nm | 4.3 nm | 4.3 nm | 5.5 nm |
| Difference, Safter-Sbefore | 3.0 nm | 3.0 nm | 3.0 nm | 0 nm | 12.0 nm | 3.0 nm |
| SNR | 2.5 dB | 3.0 dB | 1.0 dB | 2.2 dB | 2.0 dB | 2.0 dB |
| Evaluation of sticking during running (times) | 1 | 0 | 19 | 1 | 7 | 11 |
| Evaluation of scratching of the surface of the magnetic tape (times/m) | 14 | 11 | 30 | 33 | 4 | 26 |

Based on the results in Table 1, the magnetic tapes of Examples were determined to afford good electromagnetic characteristics, to exhibit little sticking of the head and the magnetic tape during running, and to inhibit scratching.

An aspect of the present invention can be useful in the technical field of magnetic tapes for high-density recording, such as data backup tapes, which are required to afford highly reliable use for extended periods.

Although the present invention has been described in considerable detail with regard to certain versions thereof, other versions are possible, and alterations, permutations and equivalents of the version shown will become apparent to those skilled in the art upon a reading of the specification. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic tape,
   which comprises a magnetic layer comprising ferromagnetic powder and binder on a nonmagnetic support,
   wherein a magnetic layer comprises a fatty acid ester;
   a full width at half maximum of a spacing distribution as measured by optical interferometry on a magnetic layer side surface of the magnetic tape before vacuum heating the magnetic tape is greater than 0 nm but less than or equal to 5.0 nm;
   a full width at half maximum of a spacing distribution as measured by optical interferometry on a magnetic layer side surface of the magnetic tape after vacuum heating the magnetic tape is greater than 0 nm but less than or equal to 5.0 nm; and
   a difference between a spacing $S_{after}$ as measured by optical interferometry on a magnetic layer side surface of the magnetic tape after vacuum heating the magnetic tape and a spacing $S_{before}$ as measured by optical interferometry on a magnetic layer side surface of the magnetic tape before vacuum heating the magnetic tape, $S_{after}-S_{before}$, is greater than 0 nm but less than or equal to 8.0 nm.

2. The magnetic tape according to claim 1,
wherein a centerline average surface roughness Ra measured on a magnetic layer side surface of the magnetic tape is less than or equal to 2.8 nm.

3. The magnetic tape according to claim 1,
wherein a centerline average surface roughness Ra measured on a magnetic layer side surface of the magnetic tape is less than or equal to 2.5 nm.

4. The magnetic tape according to claim 1,
wherein a centerline average surface roughness Ra measured on a magnetic layer side surface of the magnetic tape is less than or equal to 2.0 nm.

5. The magnetic tape according to claim 1,
wherein the magnetic layer comprises nonmagnetic filler.

6. The magnetic tape according to claim 5,
wherein the nonmagnetic filler is colloidal particles.

7. The magnetic tape according to claim 6,
wherein the colloidal particles are silica colloidal particles.

8. The magnetic tape according to claim 5,
wherein the nonmagnetic filler is carbon black.

9. The magnetic tape according to claim 1,
which comprises a nonmagnetic layer comprising nonmagnetic powder and binder between the nonmagnetic support and the magnetic layer.

10. The magnetic tape according to claim 1,
wherein the magnetic layer further comprises a fatty acid.

11. A method of manufacturing a magnetic tape,
wherein the magnetic tape comprises a magnetic layer comprising ferromagnetic powder and binder on a nonmagnetic support,
wherein a magnetic layer comprises a fatty acid ester;
a full width at half maximum of a spacing distribution as measured by optical interferometry on a magnetic layer side surface of the magnetic tape before vacuum heating the magnetic tape is greater than 0 nm but less than or equal to 5.0 nm;
a full width at half maximum of a spacing distribution as measured by optical interferometry on a magnetic layer side surface of the magnetic tape after vacuum heating the magnetic tape is greater than 0 nm but less than or equal to 5.0 nm; and
a difference between a spacing $S_{after}$ as measured by optical interferometry on a magnetic layer side surface of the magnetic tape after vacuum heating the magnetic tape and a spacing $S_{before}$ as measured by optical interferometry on a magnetic layer side surface of the magnetic tape before vacuum heating the magnetic tape, $S_{after}-S_{before}$, is greater than 0 nm but less than or equal to 8.0 nm; and the method comprises:
coating and drying a magnetic layer-forming composition comprising ferromagnetic powder, binder, and a fatty acid ester on a nonmagnetic support to form a magnetic layer; and
applying vibration to the magnetic layer that has been formed.

12. The method of manufacturing a magnetic tape according to claim 11,
wherein a centerline average surface roughness Ra measured on a magnetic layer side surface of the magnetic tape is less than or equal to 2.8 nm.

13. The method of manufacturing a magnetic tape according to claim 11,
wherein a centerline average surface roughness Ra measured on a magnetic layer side surface of the magnetic tape is less than or equal to 2.5 nm.

14. The method of manufacturing a magnetic tape according to claim 11,
wherein a centerline average surface roughness Ra measured on a magnetic layer side surface of the magnetic tape is less than or equal to 2.0 nm.

15. The method of manufacturing a magnetic tape according to claim 11,
wherein the magnetic layer comprises nonmagnetic filler.

16. The method of manufacturing a magnetic tape according to claim 15,
wherein the nonmagnetic filler is colloidal particles.

17. The method of manufacturing a magnetic tape according to claim 16,
wherein the colloidal particles are silica colloidal particles.

18. The method of manufacturing a magnetic tape according to claim 15,
wherein the nonmagnetic filler is carbon black.

19. The method of manufacturing a magnetic tape according to claim 11,
wherein the magnetic tape comprises a nonmagnetic layer comprising nonmagnetic powder and binder between the nonmagnetic support and the magnetic layer.

20. The method of manufacturing a magnetic tape according to claim 11,
wherein the magnetic layer further comprises a fatty acid.

* * * * *